(12) United States Patent
Mortland

(10) Patent No.: US 12,435,554 B2
(45) Date of Patent: *Oct. 7, 2025

(54) ARTICULATED HINGE ASSEMBLY FOR AN AIRCRAFT DOOR

(71) Applicant: The Boeing Company, Arlington, VA (US)

(72) Inventor: Michael T. Mortland, Mukilteo, WA (US)

(73) Assignee: The Boeing Company, Arlington, VA (US)

( * ) Notice: Subject to any disclaimer, the term of this patent is extended or adjusted under 35 U.S.C. 154(b) by 275 days.

This patent is subject to a terminal disclaimer.

(21) Appl. No.: 18/183,225

(22) Filed: Mar. 14, 2023

(65) Prior Publication Data

US 2024/0309685 A1    Sep. 19, 2024

(51) Int. Cl.
*E05D 3/06* (2006.01)
*B64C 1/14* (2006.01)

(52) U.S. Cl.
CPC .............. *E05D 3/06* (2013.01); *B64C 1/1423* (2013.01)

(58) Field of Classification Search
CPC ........... E05D 3/06; E05D 3/186; E05D 3/122; E05D 3/12; E05D 3/14; E05D 3/16; E05D 7/04; E05D 5/0276; E05D 11/06; E05D 2003/163; E05Y 2900/502; E05Y 2201/618; E05Y 2201/62; E05Y 2201/71; E05Y 2201/716; E05Y 2201/712; E05Y 2201/638; E05Y 2201/21; E05Y 2201/254;

(Continued)

(56) References Cited

U.S. PATENT DOCUMENTS 4,199,120 A    4/1980    Bergman et al.
4,854,010 A *  8/1989    Maraghe .................. E05D 3/18
                                                    49/248

(Continued)

FOREIGN PATENT DOCUMENTS

EP    2644495 A1    10/2013
EP    3421351 B1    4/2020

OTHER PUBLICATIONS

Extended European Search Report and corresponding EP Application No. 24153606.9 dated Jul. 26, 2024 (9 pages).

*Primary Examiner* — Jason W San
*Assistant Examiner* — Matthew J Sullivan
(74) *Attorney, Agent, or Firm* — Jay J. Hoette; The Small Patent Law Group, LLC

(57) ABSTRACT

An articulated hinge assembly for connecting a door to a fuselage of an aircraft includes an articulated hinge arm having a first hinge member pivotably coupled to a second hinge member at an elbow. The first hinge member includes a fuselage fitting pivotably coupled to a fuselage bracket. The second hinge member includes a door fitting pivotably coupled to a door bracket of the door. The articulated hinge assembly includes a linkage assembly coupled to the articulated hinge arm, the fuselage fitting and the door fitting. The linkage assembly includes a hinge linkage assembly coupled to the articulated hinge arm and the fuselage fitting and controlling movement of the hinge members relative to each other and relative to the fuselage fitting. The linkage assembly includes a door linkage assembly coupled to the articulated hinge arm and the door to control positioning of the door between open and closed positions.

20 Claims, 17 Drawing Sheets

(58) Field of Classification Search
CPC ......... E05Y 2201/624; E05Y 2201/686; B64C 1/1423; B64C 1/1407
See application file for complete search history.

(56) References Cited

U.S. PATENT DOCUMENTS

| | | | | |
|---|---|---|---|---|
| 5,379,971 | A * | 1/1995 | Kim | B64C 1/1407 244/129.5 |
| 6,685,139 | B2 * | 2/2004 | Blum | B64C 1/1407 49/246 |
| 6,834,834 | B2 * | 12/2004 | Dazet | B64C 1/143 244/129.4 |
| 7,357,354 | B2 * | 4/2008 | Mortland | B64C 1/1407 244/129.4 |
| 8,082,630 | B2 * | 12/2011 | Sprague | E05D 5/043 296/146.12 |
| 8,919,699 | B2 * | 12/2014 | Kress | B64C 1/1407 244/129.4 |
| 10,189,556 | B2 * | 1/2019 | Minchau | B64C 1/1423 |
| 11,447,232 | B2 * | 9/2022 | Mortland | B64C 9/04 |
| 11,512,512 | B2 * | 11/2022 | Means | E05D 7/009 |
| 12,163,365 | B2 * | 12/2024 | Mortland | E05D 3/06 |
| 2002/0096602 | A1 | 7/2002 | Dazet et al. | |
| 2009/0007375 | A1 * | 1/2009 | Frank | E05D 7/0423 16/238 |
| 2016/0083071 | A1 * | 3/2016 | Pichlmaier | B64C 1/1423 92/76 |
| 2020/0056829 | A1 * | 2/2020 | Cai | E05F 1/1253 |
| 2020/0300013 | A1 * | 9/2020 | Chadwell | E05D 11/1057 |
| 2023/0101291 | A1 * | 3/2023 | Dosenbach | E05F 15/614 |
| 2024/0133225 | A1 * | 4/2024 | Mortland | E05F 15/614 |

\* cited by examiner

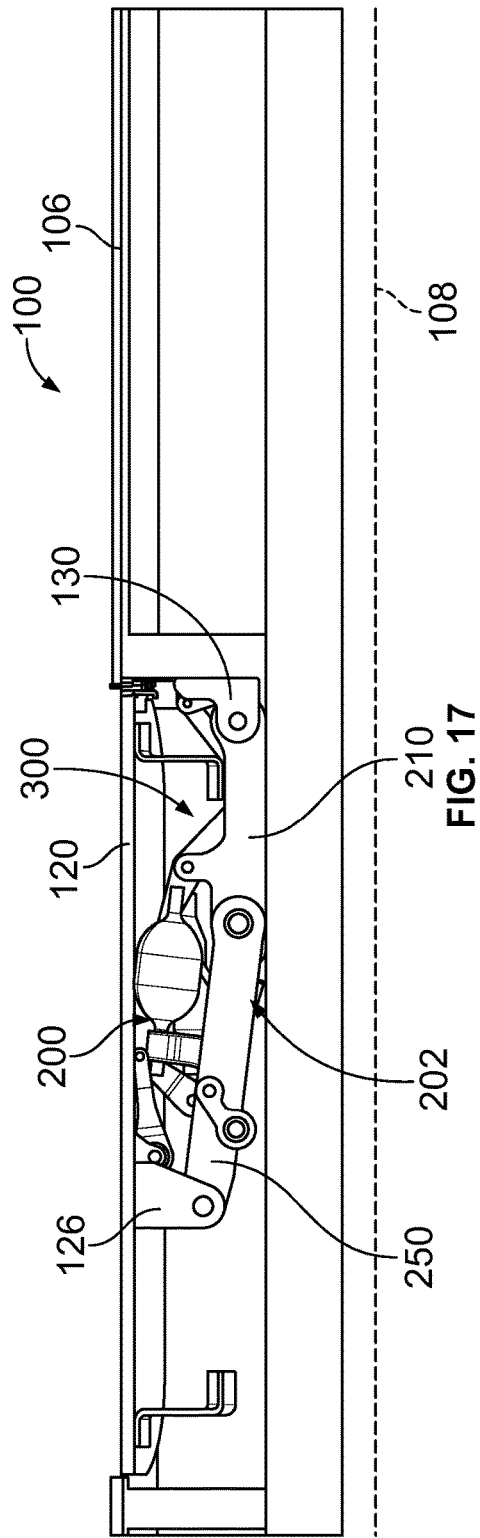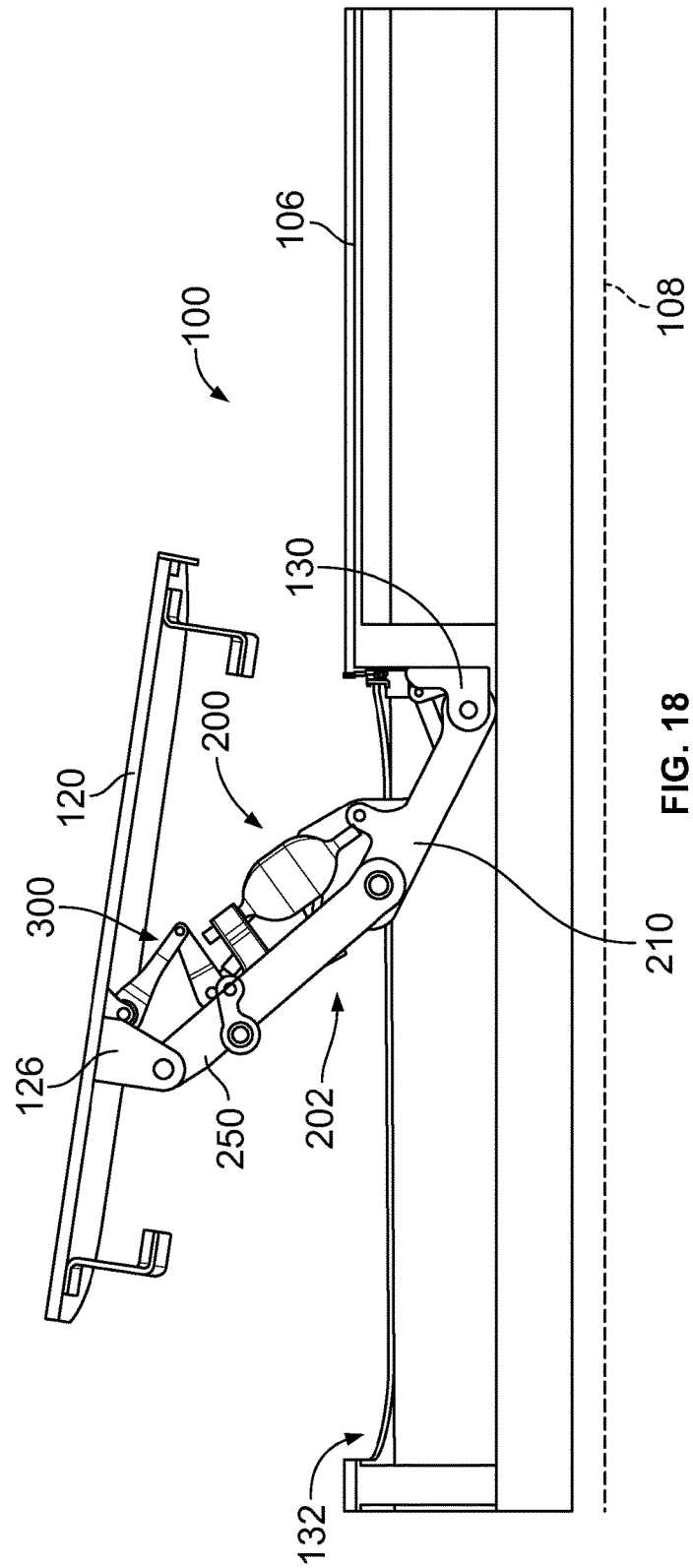

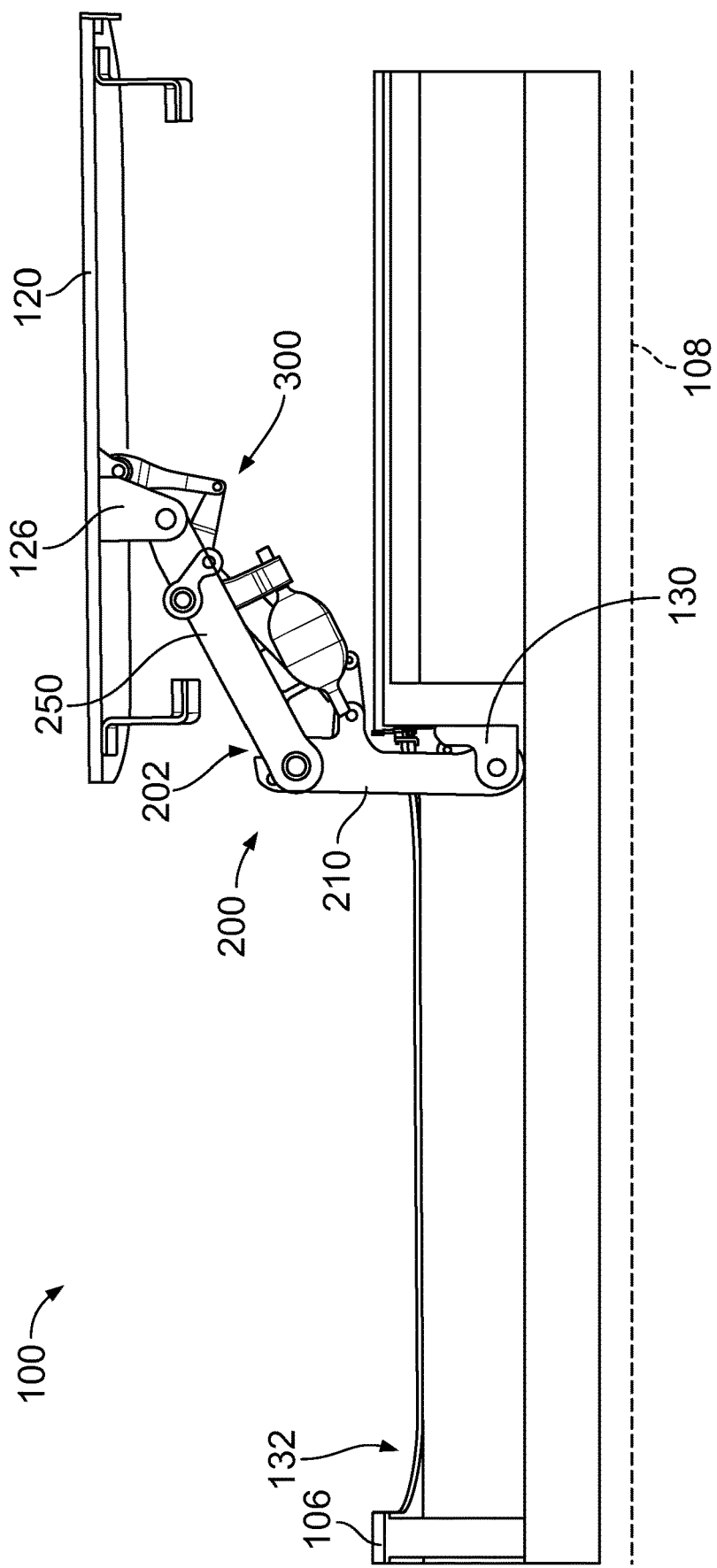

ARTICULATED HINGE ASSEMBLY FOR AN AIRCRAFT DOOR

BACKGROUND

The subject matter herein relates generally to aircraft doors.

An important part of any door assembly is the hinge assembly that connects the door to the adjacent aircraft fuselage structure. One particular type of hinge assembly is arranged so that, when the door is opened, the door physically separates from the surrounding structure and is translated out and away from the body while the door itself maintains a relatively parallel orientation to the longitudinal axis of the aircraft fuselage. The hinge also translates the door forward to provide a clear opening into the aircraft as the door swings away from the body. When the door is completely open, the inside face of the door is adjacent the outer skin of the aircraft.

Many hinge assemblies used with translating-motion-type aircraft doors include both a structural hinge for securing the door to the aircraft and a mechanical linkage that provides a second door-to-fuselage connection. The mechanical linkage is employed to control the rotational orientation of the door along its vertical axis so that, as the door is moved away from the fuselage, the door is moved to an open position, such as along the outer skin of the aircraft. If the movement of the door was not controlled, the door would swing free at the end of the hinge and be difficult to maneuver and/or strike the outer skin of the fuselage. The mechanical linkage used in conventional door assemblies is typically bulky and extends a considerable distance into the interior of the fuselage. The space occupied by the mechanical linkage limits availability of such space for other purposes, such as for stowage, seating, or other purposes.

What is needed is a low profile hinge assembly for connecting a door to a fuselage of an aircraft.

BRIEF DESCRIPTION

In one embodiment, an articulated hinge assembly for connecting a door to a fuselage of an aircraft is provided. The articulated hinge assembly includes an articulated hinge arm having a first hinge member and a second hinge member pivotably coupled to the first hinge member at an elbow. The first hinge member includes a fuselage fitting configured to be pivotably coupled to a fuselage bracket mounted to the fuselage adjacent a door opening of the aircraft. The second hinge member includes a door fitting configured to be pivotably coupled to a door bracket of the door. The articulated hinge assembly includes a linkage assembly coupled to the articulated hinge arm, the fuselage fitting and the door fitting. The linkage assembly includes a hinge linkage assembly coupled to the articulated hinge arm and the fuselage fitting. The hinge linkage assembly controls movement of the first hinge member and the second hinge member relative to each other and relative to the fuselage fitting. The linkage assembly includes a door linkage assembly coupled to the articulated hinge arm and the door to control positioning of the door relative to the second hinge member when the door is moved from a door closed position to a door open position. The linkage assembly configured to cause the door to move along a programed path relative to the fuselage as the door moves from the door closed position to the door open position.

In another embodiment, an articulated hinge assembly for connecting a door to a fuselage of an aircraft is provided. The articulated hinge assembly includes an articulated hinge arm having a first hinge member, a second hinge member, and a connecting shaft. The first and second hinge members are pivotably coupled to the connecting shaft at an elbow. The first hinge member extends between an forward end and an aft end. The aft end of the first hinge member is coupled to the connecting shaft. The first hinge member includes a fuselage fitting at the forward end of the first hinge member configured to be pivotably coupled to a fuselage bracket mounted to the fuselage adjacent a door opening of the aircraft. The second hinge member includes an forward end and an aft end. The forward end of the second hinge member is coupled to the connecting shaft. The second hinge member includes a door fitting at the aft end of the second hinge member configured to be pivotably coupled to a door bracket of the door. The articulated hinge assembly includes a linkage assembly coupled to the articulated hinge arm, the fuselage fitting and the door fitting. The linkage assembly includes a hinge linkage assembly coupled to the articulated hinge arm and the fuselage fitting. The hinge linkage assembly controls movement of the first hinge member and the second hinge member relative to each other and relative to the fuselage fitting. The hinge linkage assembly includes a hinge pivot arm pivotably coupled to the first hinge member. The hinge linkage assembly includes a hinge connecting arm between the hinge pivot arm and the fuselage bracket. The hinge linkage assembly includes a hinge link arm between the hinge pivot arm and the second hinge member. The articulated hinge assembly includes a door linkage assembly coupled to the articulated hinge arm and the door to control positioning of the door relative to the second hinge member when the door is moved from a door closed position to a door open position. The door linkage assembly includes a door pivot arm pivotably coupled to the second hinge member. The door linkage assembly includes a door connecting arm between the door pivot arm and the first hinge member. The door linkage assembly includes a door link arm between the door pivot arm and the door bracket. The linkage assembly configured to cause the door to move along a programed path relative to the fuselage as the door moves from the door closed position to the door open position.

In a further embodiment, an articulated hinge assembly for connecting a door to a fuselage of an aircraft is provided. The articulated hinge assembly includes an articulated hinge arm having a first hinge member and a second hinge member pivotably coupled to the first hinge member at an elbow. The first hinge member includes a fuselage fitting configured to be pivotably coupled to a fuselage bracket mounted to the fuselage adjacent a door opening of the aircraft. The second hinge member includes a door fitting configured to be pivotably coupled to a door bracket of the door. The articulated hinge assembly includes a linkage assembly coupled to the articulated hinge arm, the fuselage fitting and the door fitting. The linkage assembly includes a hinge linkage assembly coupled to the articulated hinge arm and the fuselage fitting. The hinge linkage assembly controls movement of the first hinge member and the second hinge member relative to each other and relative to the fuselage fitting. The linkage assembly includes a door linkage assembly coupled to the articulated hinge arm and the door to control positioning of the door relative to the second hinge member when the door is moved from a door closed position to a door open position. The linkage assembly configured to cause the door to move along a programed path relative to the fuselage as the door moves from the door closed position to the door open position. The articulated hinge assembly includes an emergency power assist assembly attached between the linkage assembly and the articulated hinge arm so as to drive the door open in an emergency, and to limit the speed of the motion of the articulated hinge arm when the articulated hinge arm is moved between the door closed position to the door open position.

BRIEF DESCRIPTION OF THE DRAWINGS

FIG. 17 illustrates the door assembly immediately after opening motion has started, just after the door leaves the fully closed position in accordance with an exemplary embodiment.

FIG. 18 illustrates the door assembly in a partially opened position showing the door removed from the door opening in accordance with an exemplary embodiment.

FIG. 20 illustrates the door in a fully open position in accordance with an exemplary embodiment.

DETAILED DESCRIPTION

Figure 1:
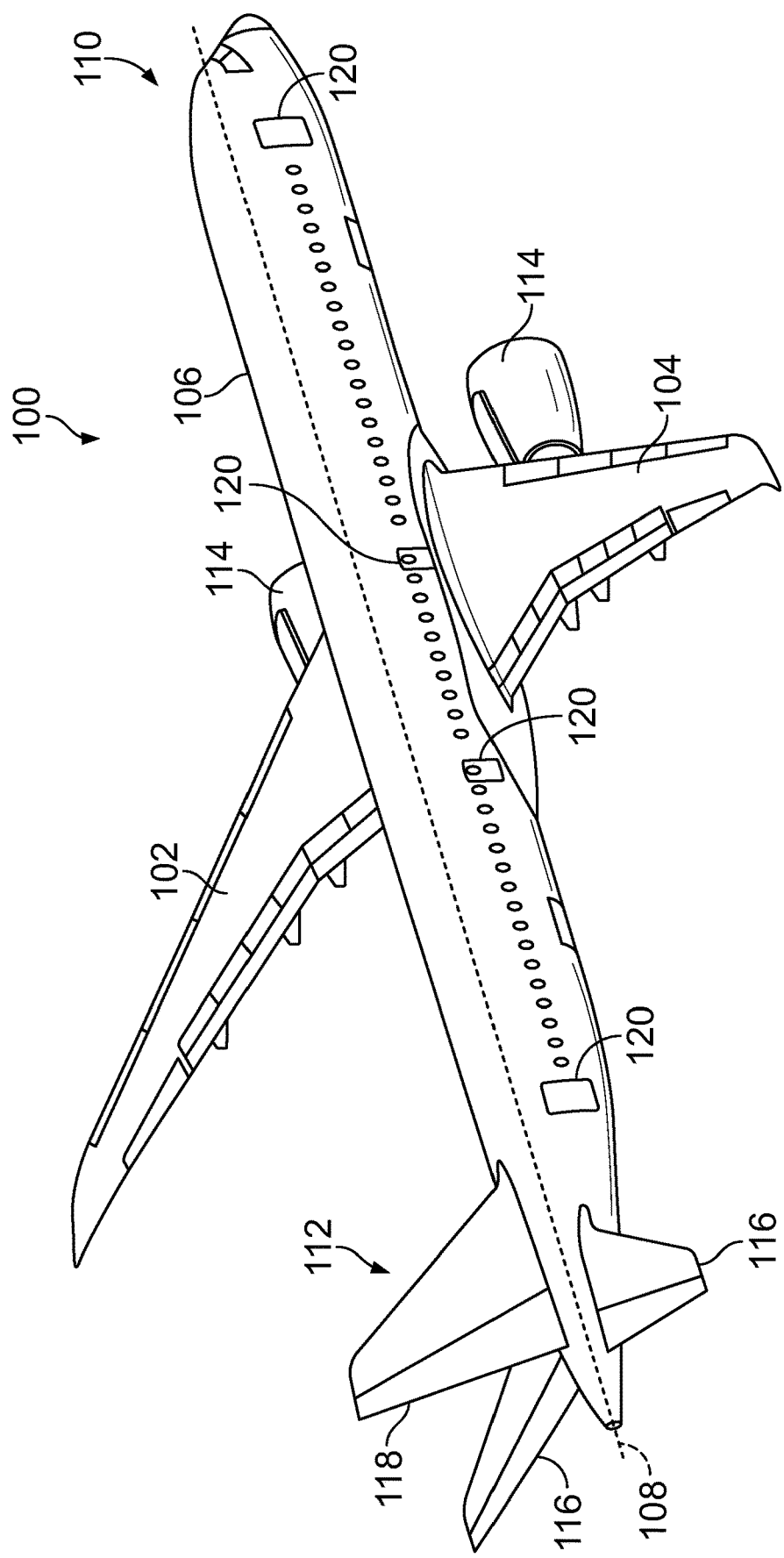
FIG. 1 illustrates an aircraft in accordance with an exemplary embodiment.

FIG. 1 illustrates an aircraft 100 in accordance with an exemplary embodiment. The aircraft 100 has wings 102, 104 attached to a fuselage 106. The fuselage 106 extends along a longitudinal axis 108 between a nose section 110 at the front of the aircraft 100 and a tail section 112 at the rear of the aircraft 100. The aircraft 100 includes engines 114 attached to the wings 102, 104. The fuselage 106 has horizontal stabilizers 116 and a vertical stabilizer 118 at the tail section 112.

A passenger cabin is present in the fuselage 106 of the aircraft 100. The passenger cabin is part of a pressure-controlled interior in fuselage 106 of aircraft 100. Doors 120 are present in fuselage 106 to provide access to the passenger cabin. The doors 120 may be passenger entry/exit doors used for loading and unloading passengers. The doors 120 may be emergency doors, such as over the wings 102, 104. One or more of the doors 120 are attached to the fuselage 106 using articulated hinge assemblies 200 (shown in FIGS. 2 and 3) in accordance with exemplary embodiments.

Figure 2:
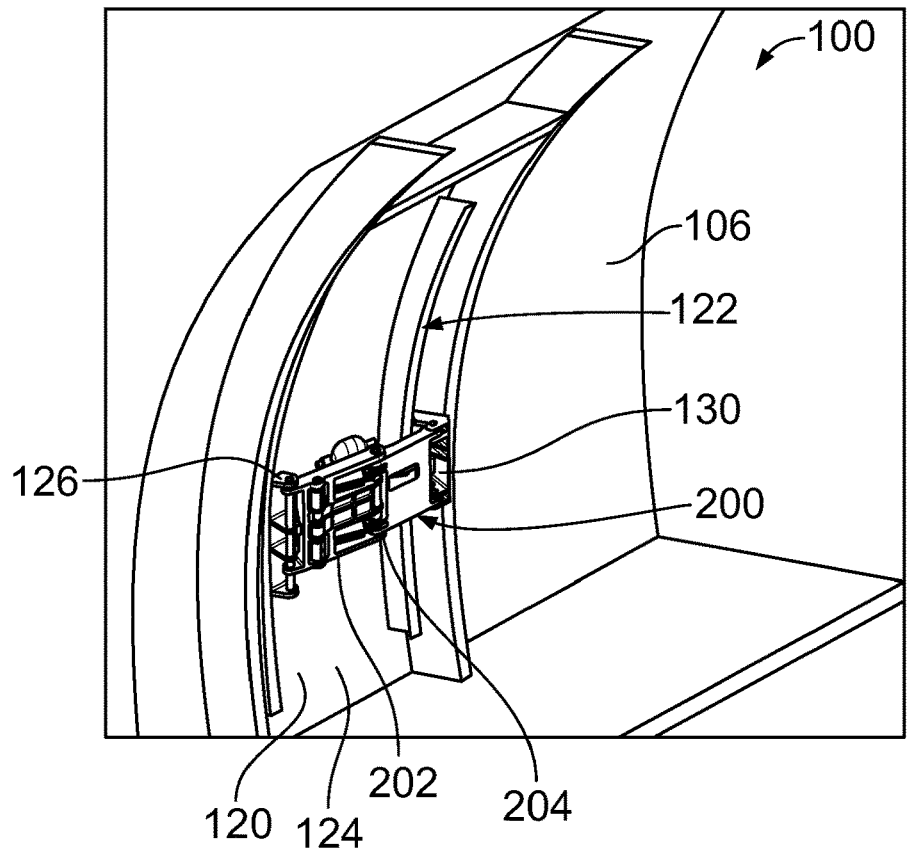
FIG. 2 illustrates an articulated hinge assembly in accordance with an exemplary embodiment showing the door in a door closed position.
Figure 3:
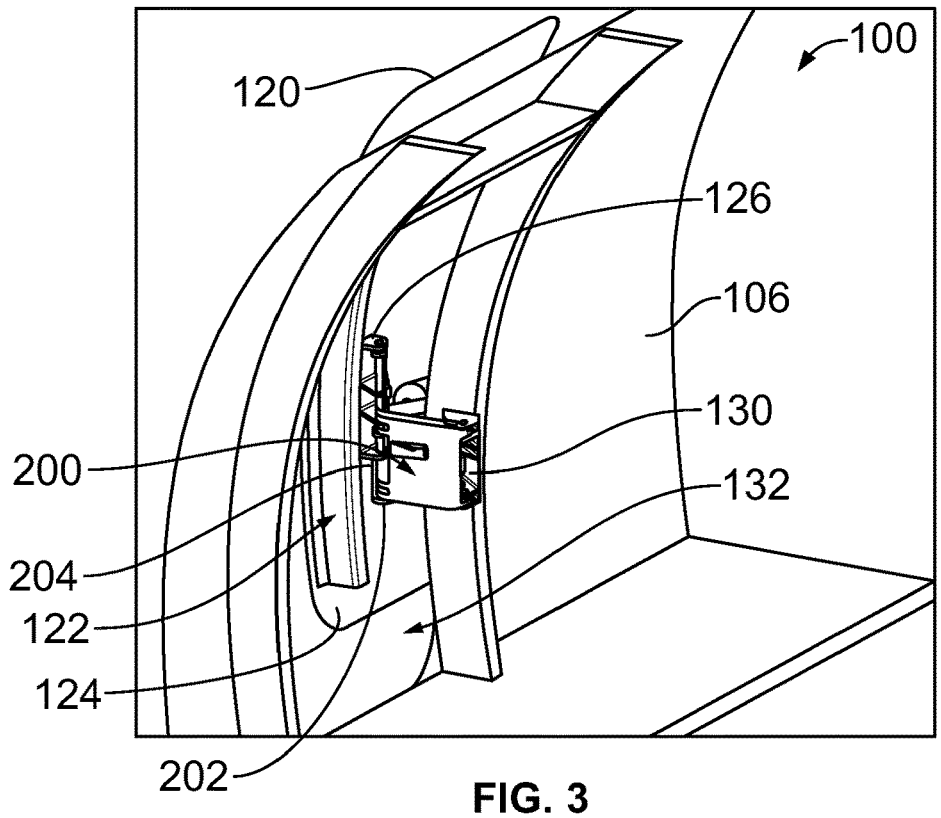
FIG. 3 illustrates the articulated hinge assembly in accordance with an exemplary embodiment showing the door in a door open position.

FIG. 2 illustrates an articulated hinge assembly 200 in accordance with an exemplary embodiment showing the door 120 in a door closed position. FIG. 3 illustrates the articulated hinge assembly 200 in accordance with an exemplary embodiment showing the door 120 in a door open position. The articulated hinge assembly 200 is used for connecting the door 120 to the fuselage 106 of the aircraft 100. The articulated hinge assembly 200 is articulated and capable of folding or bending as the door 120 is moved between the door closed position and the door open position.

The door 120 includes a door frame structure 122 and a door skin 124. An interior lining or interior cosmetic panel (not shown) is removed to illustrate the door structure 122 and the articulated hinge assembly 200. The door structure 122 may include vertical frame members, such as at the exterior or edge, and horizontal beam members across the interior to form the door structure 122.

The articulated hinge assembly 200 includes components which allow it to perform in its intended manner. Many of these components are common to mechanical systems, such as pins, fasteners, brackets and the like. The following description shall describe selected components and their arrangement and combination needed to understand the structure and operation of the articulated hinge assembly 200.

The articulated hinge assembly 200 includes an articulated hinge arm 202, which provides the structural support member that connects the door 120 to the fuselage 106. The articulated hinge arm 202 pivots at both ends (for example, at the fuselage 106 and at the door 120) and pivots at a central region of the articulated hinge arm 202. The articulated hinge arm 202 supports the door 120 through a range of motion. The articulated hinge arm 202 is articulated at a joint or elbow 204, which may be approximately centered between the connection points with the fuselage 106 and the door 120. The articulated hinge arm 202 bends or folds at the elbow 204 to translate the door 120 outward and forward to the door open position.

The articulated hinge assembly 200 is configured to cause the door 120 to move along a programed path. For example, the articulated hinge assembly 200 may cause the door 120 to open to a generally parallel orientation relative to the longitudinal axis 108 of the fuselage 106 as the door 120 moves from the door closed position to the door open position. In other various embodiments, the door 120 may be over-rotated or under-rotated to change the orientation of the door 120 and follow the tapered section of the fuselage. For example, the door 120 may be over-rotated to angle the front edge of door 120 inward or the door 120 may be under-rotated to angle front edge of the door 120 outward. When the door 120 is fully opened, the inside of the door 120 is adjacent the outer skin of the aircraft 100. The articulated hinge assembly 200 controls the orientation and position of the door 120 while the door 120 is translated out away from, and forward of, the door opening in the fuselage 106.

In the door open position, the articulated hinge arm 202 may be generally L-shaped to position the door 120 outward of the outer skin of the aircraft 100. For example, the hinge members of the articulated hinge arm 202 may be oriented at an angle between 85 and 105 degrees in the door open position. The L-shaped nature of the articulated hinge arm 202 at the elbow 204 accommodates the shape of the fuselage 106 around the door opening in order to position the door 120 close to the outer skin of the fuselage 106 in the door open position. The L-shaped hinge elbow 204 formed by the articulated hinge arm 202 receives a portion of the fuselage 106 around the door opening to position the door close to the outer skin of the fuselage 106 in the door open position.

The articulated hinge assembly 200 is connected to the door structure 122 at a door bracket 126 of the door structure 122. In an exemplary embodiment, the door 120 is pivotably coupled to the door bracket 126 and pivots relative to the door bracket 126 as the door 120 is opened and closed. In various embodiments, the door bracket 126 may be located approximately centered on the door 120, such as being vertically centered and/or horizontally centered on the door 120.

The articulated hinge assembly 200 is connected to the fuselage 106 at a fuselage bracket 130 mounted to the fuselage 106 adjacent a door opening 132. A pressure seal (not shown) may surround the door opening 132. The door 120 is used to provide closure to the door opening 132. In an exemplary embodiment, the door 120 is pivotably coupled to the fuselage bracket 130 and pivots relative to the fuselage bracket 130 as the door 120 is opened and closed.

Figure 4:
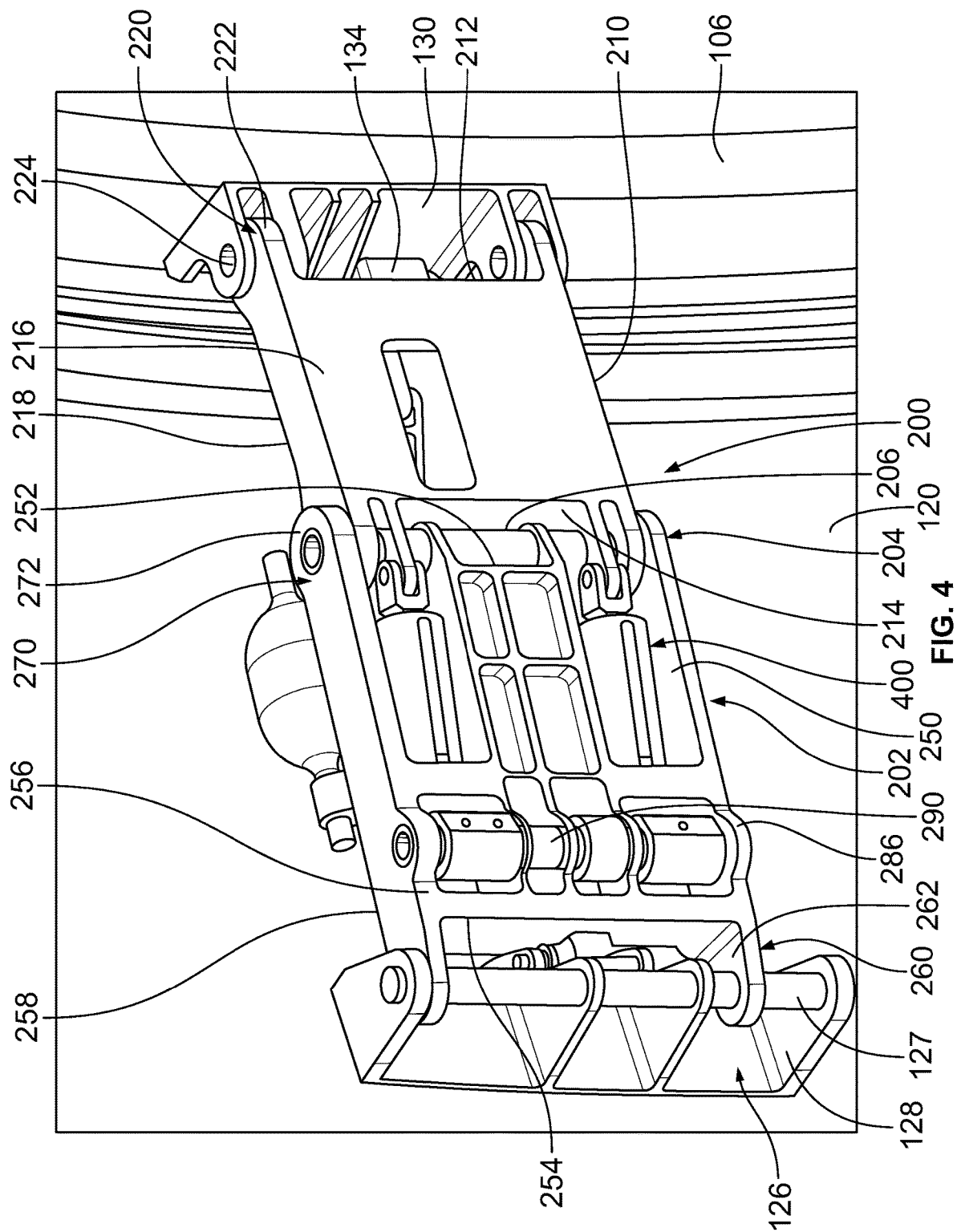
FIG. 4 is a front perspective view of the articulated hinge assembly in accordance with an exemplary embodiment.
Figure 5:
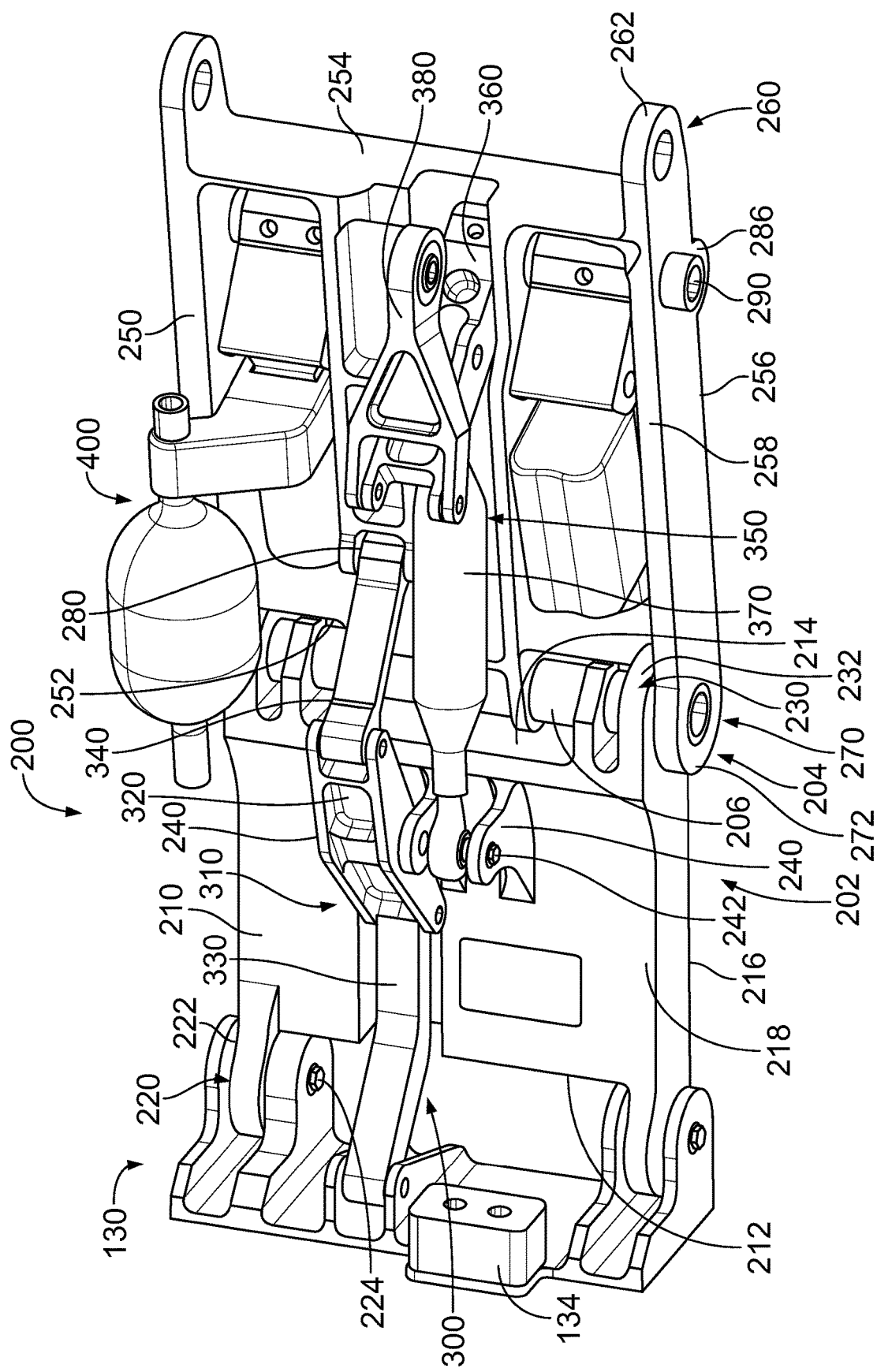
FIG. 5 is a rear perspective view of the articulated hinge assembly in accordance with an exemplary embodiment.

FIG. 4 is a front perspective view of the articulated hinge assembly 200 in accordance with an exemplary embodiment. FIG. 5 is a rear perspective view of the articulated hinge assembly 200 in accordance with an exemplary embodiment. FIG. 4 illustrates the hinge assembly 200 connected to the door 120 and the fuselage 106. FIG. 5 removes the door 120 and the fuselage 106 to illustrate the components of the articulated hinge assembly 200.

The articulated hinge assembly 200 includes the articulated hinge arm 202, a linkage assembly 300 (FIG. 5) coupled to the articulated hinge arm 202, and an emergency power assist assembly 400 attached between the linkage assembly 300 and the articulated hinge arm 202. The articulated hinge assembly 200 has a low-profile. For example, the linkage assembly 300 and the emergency power assist assembly 400 are generally contained within the envelope or space of the articulated hinge arm 202 and do not occupy significant space outside of the articulated hinge arm 202, thus leaving such space for other aircraft components within the passenger cabin (for example, for passenger seating or galley workspace).

The emergency power assist assembly 400 is used to assist opening of the door 120 in an emergency. For example, the emergency power assist assembly 400 includes a power driven actuator used to push against the door 120 in an opening direction to assist opening the door 120 in an emergency. The emergency power assist assembly 400 may be used to limit the speed of the motion of the articulated hinge arm 202 when the articulated hinge arm 202 is moved between the door closed position to the door open position (for example, to dampen the opening speed or the closing speed).

The linkage assembly 300 is configured to allow the articulated hinge arm 202 to pivot around the fuselage bracket 130 (FIG. 4) when the door 120 is moved from the door closed position to the door open position. The linkage assembly 300 is configured to cause the door 120 to move along a programed path, such as to an open position that is generally parallel relative to the longitudinal axis 108 of the fuselage 106. The linkage assembly 300 controls the orientation of the door 120 through the opening/closing movements. The geometry of the components of the linkage assembly 300 has been tailored to yield a desired or controlled motion (i.e., Programmed). The sizing, positioning, and orientations of the components of the linkage assembly 300 contribute to the programmability of hinge assembly 200. For example, the connection points between the linkages and the hinge members control the orientations of the hinge members relative to each other and relative to the fuselage as well as control the orientations of the door relative to the hinge members. Generally, the rotational and translational motions of the components of the linkage assembly 300 are transmitted through the various components to control the opening and closing of the door 120 relative to the fuselage 106.

The articulated hinge arm 202 includes a first hinge member 210, a second hinge member 250, and a connecting shaft 206 at the elbow 204. The first and second hinge members 210, 250 are pivotably coupled to each other at the connecting shaft 206 to form the elbow 204. The linkage assembly 300 controls movement of the first hinge member 210 relative to the fuselage 106. The linkage assembly 300 controls relative movement between the first hinge member 210 and the second hinge member 250. The linkage assembly 300 controls movement of the door 120 relative to the second hinge member 250.

In an exemplary embodiment, the first hinge member 210 is unitary metal component, such as an aluminum body, manufactured into a desired shape. In various embodiments, the first hinge member 210 is a machined part. The first hinge member 210 may be a determinant part having pre-drilled openings to receive other components, such as the linkage assembly 300. Portions of the metal body are removed to reduce weight of the first hinge member 210.

The first hinge member 210 extends between a forward end 212 and an aft end 214. The first hinge member 210 includes an interior surface 216 and an exterior surface 218. The exterior surface 218 is configured to face the door 120. In various embodiments, a cosmetic cover or lining (not shown) may be attached to the interior surface 216, which is exposed to the interior of the passenger cabin.

The first hinge member 210 includes a fuselage fitting 220 at the forward end 212. The fuselage fitting 220 is configured to be pivotably coupled to the fuselage bracket 130. In an exemplary embodiment, the fuselage fitting 220 includes lugs 222 having openings that receive bearings (not shown) and pins 224 that connect the fuselage fitting 220 to the fuselage bracket 130. Other types of connection elements may be provided at the fuselage fitting 220 to pivotably coupled to the fuselage fitting 220 to the fuselage bracket 130. In an exemplary embodiment, a bumper 134 is provided between the first hinge member 210 and the fuselage bracket 130 to stop the first hinge member 210 in the door open position. In the illustrated embodiment, the bumper 134 is coupled to the fuselage bracket 130 and the first hinge member 210 is configured to hit the bumper and stop in the door open position. However, in alternative embodiments, the bumper 134 may be coupled to the first hinge member 210 and move with the first hinge member 210 to hit the fuselage bracket 130 to stop the first hinge member 210 in the door open position.

The first hinge member 210 includes a shaft fitting 230 (FIG. 5) at the aft end 214. The shaft fitting 230 is configured to be pivotably coupled to the connecting shaft 206 at the elbow 204. In an exemplary embodiment, the shaft fitting 230 includes lugs 232 having openings that receive bearings (not shown) and the connecting shaft 206. Other types of connection elements may be provided at the shaft fitting 230 to pivotably couple the first hinge member 210 to the second hinge member 250, such as pins.

In an exemplary embodiment, the first hinge member 210 includes mounting brackets 240 (FIG. 5) for mounting the linkage assembly 300 to the first hinge member 210. The mounting brackets 240 includes openings that receive pins 242 to secure the components of the linkage assembly 300 to the mounting brackets 240. The components of the linkage assembly 300 may be pivotably coupled to the mounting brackets 240 using the pins 242. Other types of connection elements may be provided to couple the linkage assembly 300 to the first hinge member 210.

In an exemplary embodiment, the second hinge member 250 is unitary metal component, such as an aluminum body, manufactured into a desired shape. In various embodiments, the second hinge member 250 is a machined part. The second hinge member 250 may be a determinant part having predrilled openings to receive other components, such as the linkage assembly 300. Portions of the metal body are removed to reduce weight of the second hinge member 250. In various embodiments, the second hinge member 250 may have similar dimensions (for example, length, width, height) to the first hinge member 210.

The second hinge member 250 extends between a forward end 252 and an aft end 254. The second hinge member 250 includes an interior surface 256 and an exterior surface 258. The exterior surface 258 is configured to face the door 120. In various embodiments, a cosmetic cover or lining (not shown) may be attached to the interior surface 256, which is exposed to the interior of the passenger cabin.

The second hinge member 250 includes a door fitting 260 at the aft end 254. The door fitting 260 is configured to be pivotably coupled to the door bracket 126. In an exemplary embodiment, the door fitting 260 includes lugs 262 having openings that receive bearings (not shown). The lugs 262 receive a mounting shaft 127 held by a mounting bracket 128 of the door bracket 126. The mounting shaft 127 connects the door fitting 260 to the mounting bracket 128. The door fitting 260 is rotatable about the mounting shaft 127. In an exemplary embodiment, the mounting shaft 127 is slidable relative to the door fitting 260. For example, the mounting shaft 127 may be vertically slidable on the door fitting 260, such as to accommodate lifting of the door a slight distance during the door opening process. Other types of connection elements may be provided at the door fitting 260 to pivotably couple the door 120 to the door fitting 260.

The second hinge member 250 includes a shaft fitting 270 at the forward end 252. The shaft fitting 270 is configured to be pivotably coupled to the connecting shaft 206 at the elbow 204. In an exemplary embodiment, the shaft fitting 270 includes lugs 272 having openings that receive bearings (not shown). The lugs 272 receive the connecting shaft 206. Other types of connection elements may be provided at the shaft fitting 270 to pivotably couple the second hinge member 250 to the first hinge member 210, such as pins.

In an exemplary embodiment, the second hinge member 250 includes mounting brackets 280 (FIG. 5) for mounting the linkage assembly 300 to the second hinge member 250. The mounting brackets 280 includes openings that receive pins 282 to secure the components of the linkage assembly 300 to the mounting brackets 280. The components of the linkage assembly 300 may be pivotably coupled to the mounting brackets 280 using the pins 282. Other types of connection elements may be provided to couple the linkage assembly 300 to the second hinge member 250.

In an exemplary embodiment, the articulated hinge assembly 200 includes a drive shaft 290 coupled to the articulated hinge arm 202. For example, in the illustrated embodiment, the drive shaft 290 is coupled to the second hinge member 250. The drive shaft 290 may be received in mounting brackets 286 along the interior surface 256 of the second hinge member 250. In an exemplary embodiment, the emergency power assist assembly 400 is operably coupled to the drive shaft 290. Actuation of the emergency power assist assembly 400 is transferred to the drive shaft 290. The linkage assembly 300 is operably coupled to the drive shaft 290. For example, rotation of the drive shaft 290 may be transferred to the linkage assembly 300 to move the articulated hinge arm 202. The input torque from the emergency power assist assembly 400 through the drive shaft 290 pushes the articulated hinge arm 202 open. The emergency power assist assembly 400 can drive the drive shaft 290 and thereby force the linkage assembly 300 to move the articulated hinge arm 202. Similarly, rotation or pivoting of the corresponding linkage of the linkage assembly 300 is transferred to the drive shaft 290 to rotate the drive shaft 290. Such rotation of the drive shaft 290 can force a piston of the emergency power assist assembly 400 to move, in which case the emergency power assist assembly 400 acts as a motion damper. As the emergency power assist assembly 400 forces the articulated hinge arm 202 to move (open) relative to the door 120, the linkage assembly 300 (which maintains an angular relationship between the fuselage edge frame and the door) causes the door 120 to open out of the cutout. The emergency power assist assembly 400 operates as a force element operable between the articulated hinge arm 202 and the linkage assembly 300. Since there is a rotational coupling (programming linkage set) between the hinge-to-fuselage joint and the door-to-hinge joint, the forceful opening of the joint between the hinge and door via the emergency power assist assembly 400 causes motion between the articulated hinge arm 202 and the fuselage 106 and causes motion between the articulated hinge arm 202 and the door 120 to open the door 120 out of the cutout.

The linkage assembly 300 includes a hinge linkage assembly 310 and a door linkage assembly 350. The hinge linkage assembly 310 is coupled to the articulated hinge arm 202 and the fuselage bracket 130. The hinge linkage assembly 310 controls movement of the first hinge member 210 and the second hinge member 250 relative to each other. The hinge linkage assembly 310 controls movement of the first hinge member 210 relative to the fuselage bracket 130. The door linkage assembly 350 is coupled to the articulated hinge arm 202, such as to the first hinge member 210. The door linkage assembly 350 is coupled to the door 120, such as to the door bracket 126. The door linkage assembly 350 controls positioning of the door 120 relative to the second hinge member 250 when the door 120 is moved from a door closed position to a door open position. The linkage assembly 300 is configured to cause the door 120 to move along a programed path relative to the fuselage 106 as the door 120 moves from the door closed position to the door open position.

In an exemplary embodiment, the hinge linkage assembly 310 includes a plurality of link elements connected to each other and to other components to control movement of the articulated hinge assembly 200. In the illustrated embodiment, the hinge linkage assembly 310 includes a hinge pivot arm 320, a hinge connecting arm 330, and a hinge link arm 340. The hinge pivot arm 320 is pivotably coupled to the first hinge member 210. The hinge connecting arm 330 extends between the hinge pivot arm 320 and the fuselage bracket 130. The hinge link arm 340 extends between the hinge pivot arm 320 and the second hinge member 250.

In an exemplary embodiment, the door linkage assembly 350 includes a plurality of link elements connected to each other and to other components to control movement of the articulated hinge assembly 200. In the illustrated embodiment, the door linkage assembly 350 includes a door pivot arm 360, a door connecting arm 370, and a door link arm 380. The door pivot arm 360 is pivotably coupled to the second hinge member 250. The door connecting arm 370 extends between the door pivot arm 360 and the first hinge member 210. The door link arm 380 extends between the door pivot arm 360 and the door bracket 126.

Figure 6:
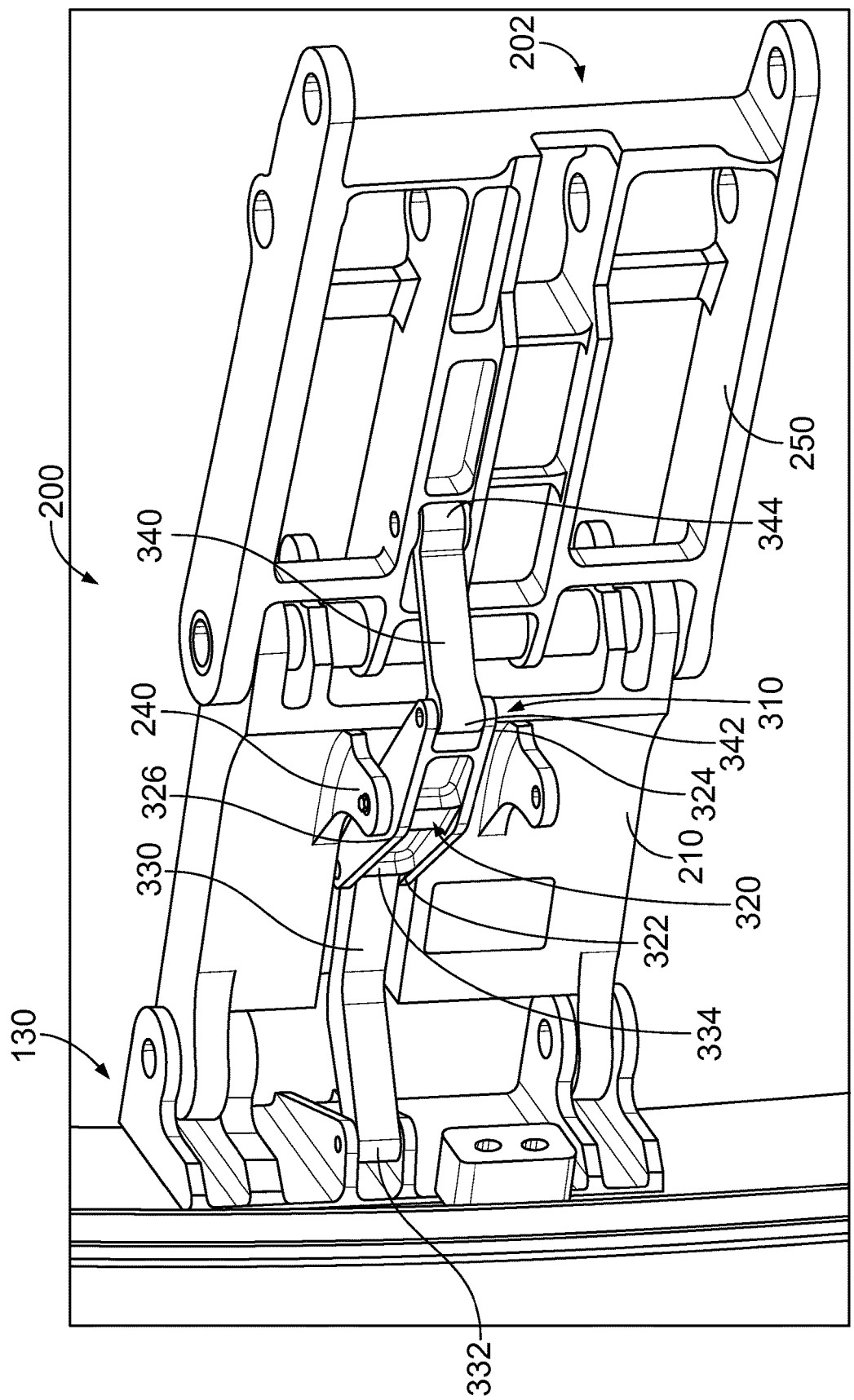
FIG. 6 is a rear perspective view of a portion of the articulated hinge assembly in accordance with an exemplary embodiment showing the hinge linkage assembly.

FIG. 6 is a rear perspective view of a portion of the articulated hinge assembly 200 in accordance with an exemplary embodiment showing the hinge linkage assembly 310. The hinge linkage assembly 310 is coupled to the fuselage bracket 130. The hinge linkage assembly 310 is coupled to the articulated hinge arm 202, such as to the first hinge member 210 and the second hinge member 250. The hinge linkage assembly 310 controls movement of the first hinge member 210 relative to the fuselage bracket 130. The hinge linkage assembly 310 controls movement of the first hinge member 210 and the second hinge member 250 relative to each other.

In an exemplary embodiment, the hinge linkage assembly 310 includes the hinge pivot arm 320, the hinge connecting arm 330, and the hinge link arm 340. The hinge connecting arm 330 operates as a force input to the hinge linkage assembly 310, such as to cause movement of the link elements. The hinge connecting arm 330 pivots the hinge pivot arm 320. The hinge pivot arm 320 moves the hinge link arm 340.

The hinge pivot arm 320 extends between a first end 322 and a second end 324. The hinge connecting arm 330 is coupled to the hinge pivot arm 320 at the first end 322. The hinge link arm 340 is coupled to the hinge pivot arm 320 at the second end 324. The hinge pivot arm 320 includes a mounting portion 326. The mounting portion 326 is located between the first and second ends 322, 324. The mounting portion 326 may be approximately centered between the first and second ends 322, 324. The hinge pivot arm 320 is pivotably coupled to the first hinge member 210 at the mounting portion 326. For example, the mounting portion 326 of the hinge pivot arm 320 is coupled to the mounting bracket 240 of the first hinge member 210, such as using the pin 242.

The hinge connecting arm 330 extends between a first end 332 and a second end 334. The first end 332 is coupled to the fuselage bracket 130, such as by a pin. The hinge connecting arm 330 may pivot relative to the fuselage bracket 130 during opening or closing of the door. The second end 334 is coupled to the hinge pivot arm 320, such as by a pin. The hinge connecting arm 330 may pivot relative to the hinge pivot arm 320 during opening and closing of the door. In an exemplary embodiment, the hinge connecting arm 330 is non-linear, such as including one or more bends or corners. In various embodiments, the hinge connecting arm 330 may be V-shaped, such as including first and second portions meeting at an intersection. The hinge connecting arm 330 may be shaped to provide clearance for other structures, such as the door structure in the open and/or closed position. The first and second portions may be angled at an obtuse angle relative to each other. The hinge connecting arm 330 may have other shapes in alternative embodiments, such as being linear or being curved.

The hinge link arm 340 extends between a first end 342 and a second end 344. The first end 342 is coupled to the hinge pivot arm 320, such as by a pin. The hinge link arm 340 may pivot relative to the hinge pivot arm 320 during opening or closing of the door. The second end 344 is coupled to the second hinge member 250, such as by a pin. The hinge link arm 340 may pivot relative to the second hinge member 250 during opening and closing of the door. In an exemplary embodiment, the hinge link arm 340 is linear. The hinge link arm 340 may have other shapes in alternative embodiments, such as being angular or being curved.

In operation, the hinge linkage assembly 310 controls movement of the articulated hinge arm 202 relative to the fuselage bracket 130 and controls movement of the first hinge member 210 and the second hinge member 250 relative to each other. For example, as the door is opened, the first hinge member 210 pivots relative to the fuselage bracket 130. The first hinge member 210 may pivot approximately 90° From the door closed position to the door open position. The hinge connecting arm 330 pivots the hinge pivot arm 320 as the first hinge member 210 is moved. The hinge link arm 340 is moved by the hinge pivot arm 320. The hinge link arm 340 moves the second hinge member 250 relative to the first hinge member 210. As such, the hinge linkage assembly 310 causes rotation of the second hinge member 250 relative to the first hinge member 210.

Figure 7:
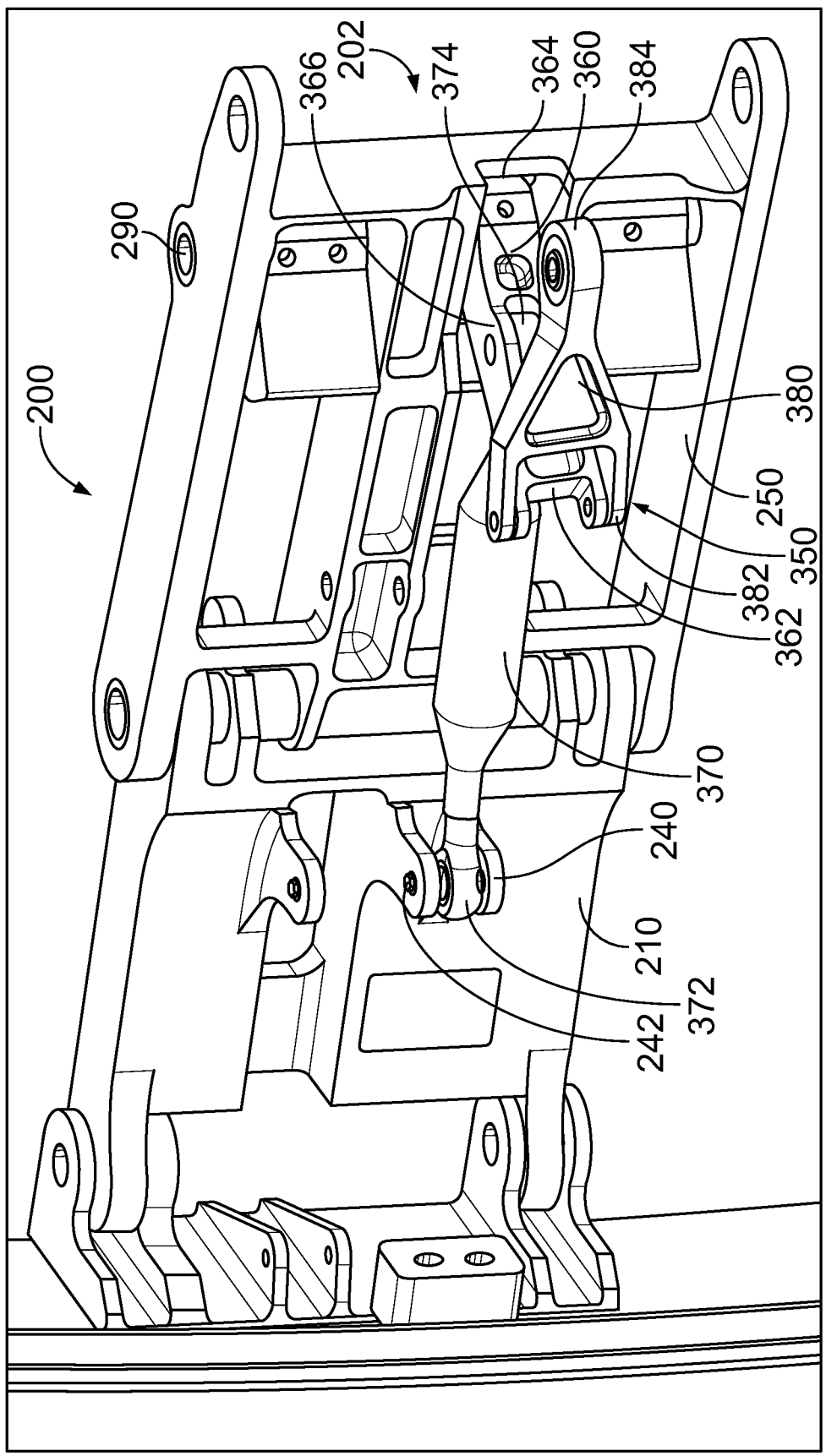
FIG. 7 is a rear perspective view of a portion of the articulated hinge assembly in accordance with an exemplary embodiment showing the door linkage assembly.

FIG. 7 is a rear perspective view of a portion of the articulated hinge assembly 200 in accordance with an exemplary embodiment showing the door linkage assembly 350. The door linkage assembly 350 is coupled to the door bracket 126 (shown in FIG. 4). The door linkage assembly 350 is coupled to the articulated hinge arm 202, such as to the first hinge member 210 and the second hinge member 250. In an exemplary embodiment, the door linkage assembly 350 is coupled to the drive shaft 290, which is rotatably coupled to the second hinge member 250. The door linkage assembly 350 controls the movement of the door bracket 126 relative to the first hinge member 210. Motion input to the door linkage assembly 350 is provided as the relative positions of the first hinge member 210 and the second hinge member 250 are changed. The door linkage assembly 350 can also be driven by actuation of the emergency power assist assembly 400 as applied through the drive shaft 290.

In an exemplary embodiment, the door linkage assembly 350 includes the door pivot arm 360, the door connecting arm 370, and the door link arm 380. The door connecting arm 370 operates as a force input to the door linkage assembly 350, such as to cause movement of the other link elements. The door connecting arm 370 pivots the door pivot arm 360. The door pivot arm 360 moves the door link arm 380 to control movement of the door.

The door pivot arm 360 extends between a first end 362 and a second end 364. The second end 364 is coupled to the drive shaft 290. Rotation of the door pivot arm 360 causes rotation of the drive shaft 290. Similarly, rotation of the drive shaft 290, such as by the emergency power assist assembly 400, is transferred to the door pivot arm 360. The door linkage assembly 350 is rotatably coupled to the second hinge member 250 through the drive shaft 290. The door link arm 380 is coupled to the door pivot arm 360 at the first end 362. The door pivot arm 360 includes a mounting portion 366. The mounting portion 366 is located between the first and second ends 362, 364. The mounting portion 366 may be approximately centered between the first and second ends 362, 364. The door connecting arm 370 is pivotably coupled to the door pivot arm 360 at the mounting portion 366, such as using a pin.

The door connecting arm 370 extends between a first end 372 and a second end 374. The first end 372 is coupled to the first hinge member 210, such as to the mounting bracket 240 of the first hinge member 210, such as using the pin 242. The door connecting arm 370 may pivot relative to the first hinge member 210 during opening or closing of the door. The second end 374 is coupled to the door pivot arm 360, such as by a pin. The door connecting arm 370 may pivot relative to the door pivot arm 360 during opening and closing of the door. In an exemplary embodiment, the door connecting arm 370 is linear. However, the door connecting arm 370 may have other shapes in alternative embodiments, such as being angular or being curved. The door connecting arm 370 may be a multi-piece component, such as including a center tube or tie-rod and two end fittings with spherical rod-end bearings. The door connecting arm 370 may be a turnbuckle link with easily adjusted length capability. This door connecting arm 370 may be easily adjustable for length as a feature to rig the mechanism positions. Changing the length of door connecting arm 370 adjusts the angular orientation of the door 120 with respect to the articulated hinge assembly 200.

The door link arm 380 extends between a first end 382 and a second end 384. The first end 382 is coupled to the door pivot arm 360, such as by a pin. The door link arm 380 may pivot relative to the door pivot arm 360 during opening or closing of the door. The second end 384 is configured to be coupled to the door bracket 126 (shown in FIG. 4). The door link arm 380 may pivot relative to the door bracket 126 during opening and closing of the door. In an exemplary embodiment, the door link arm 380 is linear. The door link arm 380 may have other shapes in alternative embodiments, such as being angular or being curved.

In operation, the door linkage assembly 350 controls movement of the door bracket 126, and thus the door 120, relative to the articulated hinge arm 202. The door linkage assembly 350 is driven by movement of the first hinge member 210 and the second hinge member 250 relative to each other. For example, as the door is opened, the door bracket 126 pivots relative to the second hinge member 250. The door connecting arm 370 pivots the door pivot arm 360 as the second hinge member 250 is moved relative to the first hinge member 210, such as by the hinge linkage assembly 310 (shown in FIG. 6). The door link arm 380 is moved by the door pivot arm 360. The door link arm 380 moves the door 120 relative to the second hinge member 250. As such, the door linkage assembly 350 causes rotation of the door 120 relative to the second hinge member 250.

Figure 8:
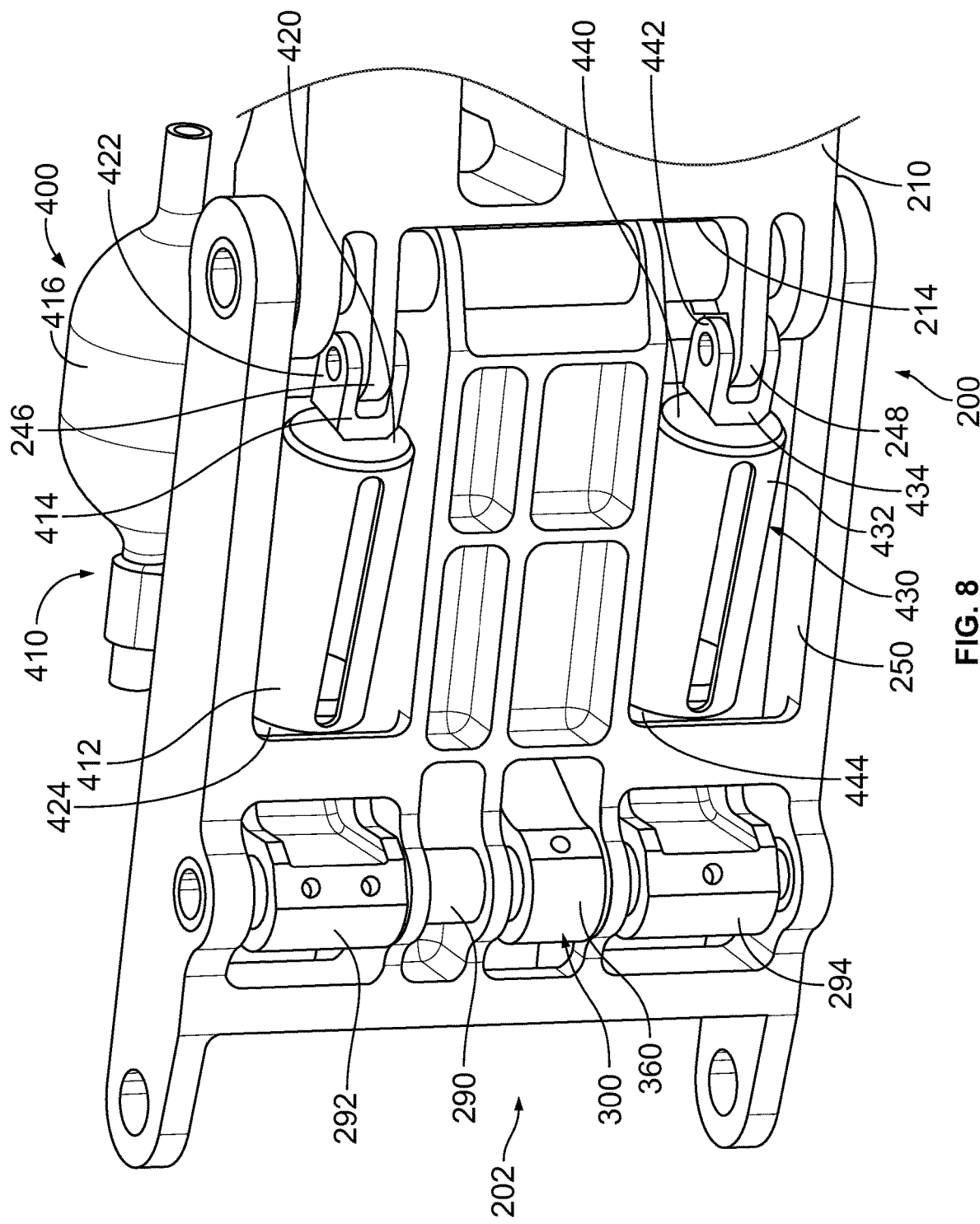
FIG. 8 is a front perspective view of a portion of the articulated hinge assembly showing the emergency power assist assembly in accordance with an exemplary embodiment.

FIG. 8 is a front perspective view of a portion of the articulated hinge assembly 200 showing the emergency power assist assembly 400 in accordance with an exemplary embodiment. The emergency power assist assembly 400 is attached to the articulated hinge arm 202. In an exemplary embodiment, the emergency power assist assembly 400 is connected to the first hinge member 210 and the second hinge member 250, such as through the drive shaft 290. The emergency power assist assembly 400 may be connected between the linkage assembly 300 and the articulated hinge arm 202.

The emergency power assist assembly 400 is used to assist opening and/or closing of the door 120. In an exemplary embodiment, the emergency power assist assembly 400 includes an emergency drive assembly 410 and a damper assembly 430. The emergency drive assembly 410 includes a power driven actuator 412 used to push against the door 120 in an opening direction to assist opening the door 120 in an emergency. The damper assembly 430 is used to limit the speed of the motion of the articulated hinge arm 202 and/or the door 120 when the door 120 is moved between the door closed position to the door open position (for example, to dampen the opening speed or the closing speed).

The emergency drive assembly 410 includes a piston 414 operably coupled to the actuator 412. The actuator 412 is used to move the piston 414 between a retracted position and an extended position. In various embodiments, the actuator 412 includes a pressure bottle 416 holding a pressurized gas, which is used to operate the actuator 412. For example, in an emergency situation, the high-pressure gas in the pressure bottle 416 is released to forcefully drive the piston 414. The actuator 412 may be operated to limit the rate of movement of the piston 414. In an exemplary embodiment, the actuator 412 is a pneumatic actuator. However, other types of actuators may be used in alternative embodiments, such as a hydraulic actuator, an electronic actuator, and the like.

In an exemplary embodiment, the piston 414 includes a piston rod 420 extending from a first end of the actuator 412. The piston rod 420 includes a connector mount 422 at the end of the piston rod 420. The connector mount 422 is configured to be coupled to the articulated hinge arm 202. In the illustrated embodiment, the connector mount 422 is coupled to a mounting bracket 246 at the front or interior of the first hinge member 210. The mounting bracket 246 may be provided at the aft end 214 of the first hinge member 210. In alternative embodiments, the connector mount 422 may be coupled to the second hinge member 250 or the drive shaft 290.

The actuator 412 includes a connector mount 424 at the second end of the actuator 412. The connector mount 424 is configured to be coupled to the drive shaft 290, such as through a shaft bracket 292 coupled to the drive shaft 290. For example, the connector mount 424 may be pivotably coupled to the shaft bracket 292 using a pin. In alternative embodiments, the connector mount 422 may be coupled directly to the second hinge member 250 or directly to the first hinge member 210 rather than being coupled to the drive shaft 290. For example, the actuator 412 may be oriented 180° with the piston 414 coupled to the drive shaft 290 and the connector mount 424 coupled to the mounting bracket 246 of the first hinge member 210. In operation, when the actuator is operated, the piston 414 presses outward against the mounting bracket 246 and the actuator 412 presses outward against the shaft bracket 292 to rotate the drive shaft 290. As the drive shaft 290 is rotated, the linkage assembly 300 is actuated, such as through the door pivot arm 360 coupled to the drive shaft 290.

The damper assembly 430 includes a housing 432 holding a piston 434. The piston 434 is movable within the housing 432 between a retracted position and an extended position. In various embodiments, the damper assembly 430 is a hydraulic damper using hydraulic pressure to control the speed or rate of movement of the piston 434 within the housing 432 to control the door opening and closing rate. Other types of damper control may be used in alternative embodiments, such as pneumatic control, electric control, mechanical control, and the like.

In an exemplary embodiment, the piston 434 includes a piston rod 440 extending from a first end of the housing 432. The piston rod 440 includes a connector mount 442 at the end of the piston rod 440. The connector mount 442 is configured to be coupled to the articulated hinge arm 202. In the illustrated embodiment, the connector mount 442 is coupled to a mounting bracket 248 at the front or interior of the first hinge member 210. The mounting bracket 246 may be provided at the aft end 214 of the first hinge member 210. In alternative embodiments, the connector mount 442 may be coupled to the second hinge member 250 or the drive shaft 290.

The housing 432 includes a connector mount 444 at the second end of the housing 432. The connector mount 444 is configured to be coupled to the drive shaft 290, such as through a shaft bracket 294 coupled to the drive shaft 290. For example, the connector mount 444 may be pivotably coupled to the shaft bracket 294 using a pin. In alternative embodiments, the connector mount 442 may be coupled directly to the second hinge member 250 or directly to the first hinge member 210 rather than being coupled to the drive shaft 290. For example, the damper assembly 430 may be oriented 180° with the piston 434 coupled to the drive shaft 290 and the connector mount 444 coupled to the mounting bracket 246 of the first hinge member 210.

The emergency power assist assembly 400 is primarily used in emergency situations to provide force to assist opening the door 120 of the aircraft 100. For example, in emergency operation, if the inside door operating handle is actuated and the door structure is lifted beyond specified stops, the actuator 412 of the emergency power assist assembly 400 is operated to provide an opening assist force to drive the door 120 completely open very quickly. When activated, the emergency power assist assembly 400 forces the articulated hinge arm 202 to open relative to the door 120 which causes the rotation at the door bracket 126. Since the door bracket 126 is operably coupled to the fuselage bracket 130 via the linkage assembly 300, the overall result of the emergency power assist assembly 400 actuation is to drive the door 120 to the full open position.

In various embodiments, the emergency power assist assembly 400 can provide damping for the door motion during operations. For example, if the speed of the door opening or closing motions becomes too great, the impact when the door 120 reaches travel limits could cause damage. The damper assembly 430 of the emergency power assist assembly 400 operates as a snubber feature to dampen, or restrict the speed of motion to an acceptable level.

Figure 9:
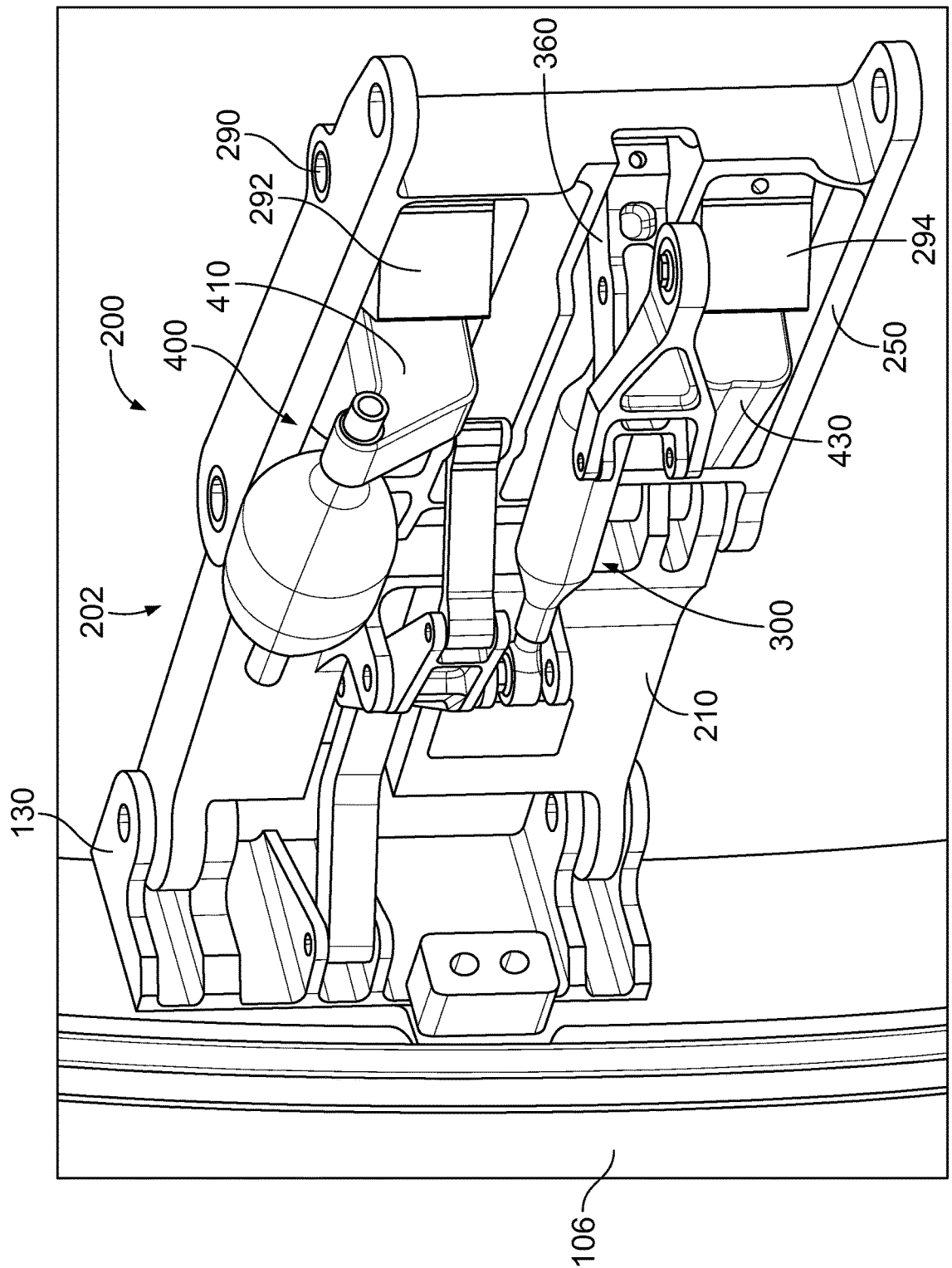
FIG. 9 is a rear perspective view of a portion of the articulated hinge assembly and the linkage assembly in accordance with an exemplary embodiment in a door closed position.
Figure 10:
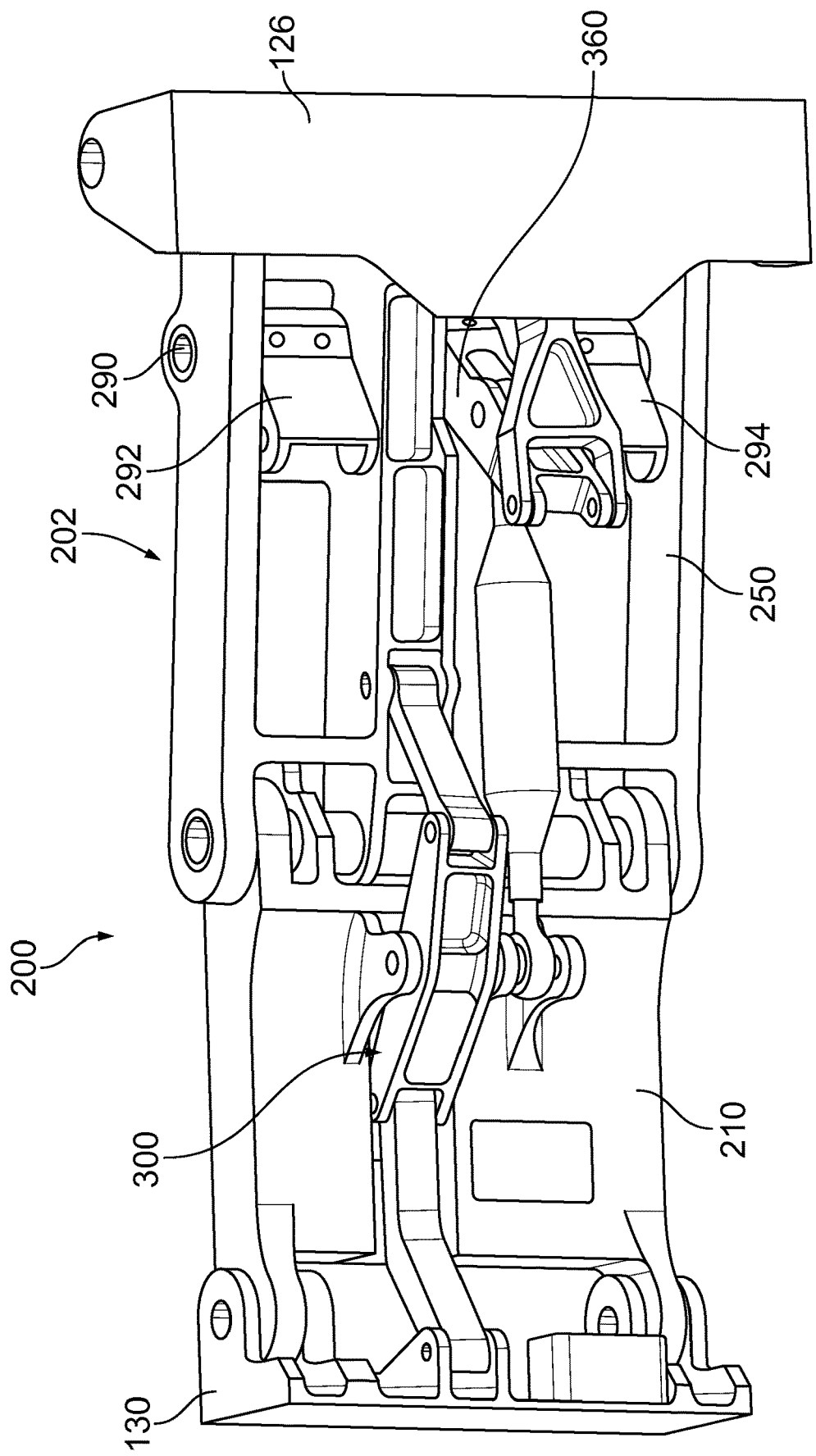
FIG. 10 is a rear perspective view of a portion of the articulated hinge assembly and the linkage assembly in accordance with an exemplary embodiment in a door closed position.
Figure 11:
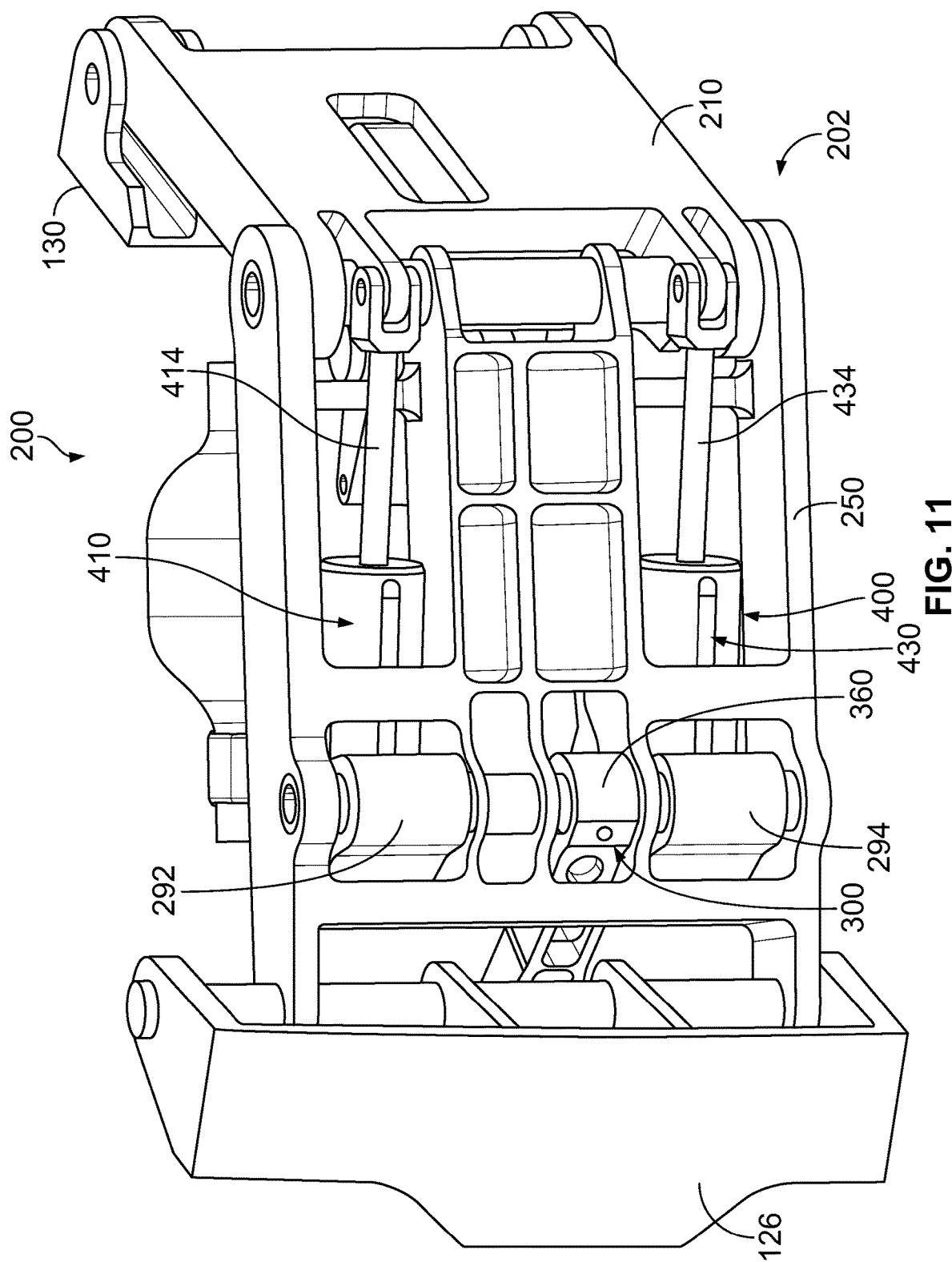
FIG. 11 is a front perspective view of a portion of the articulated hinge assembly and the linkage assembly in accordance with an exemplary embodiment in a door open position.
Figure 12:
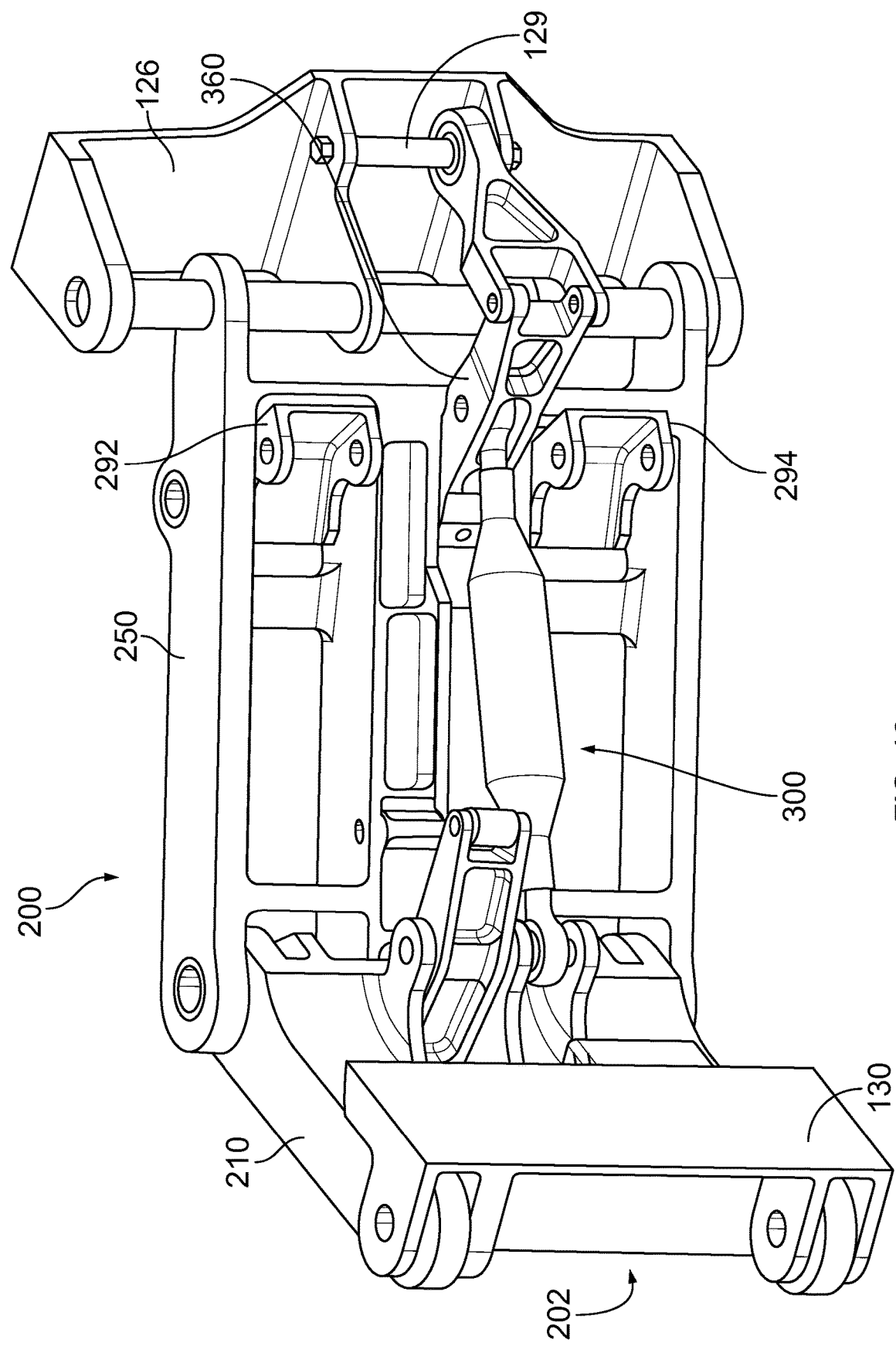
FIG. 12 is a rear perspective view of a portion of the articulated hinge assembly and the linkage assembly in accordance with an exemplary embodiment in a door open position.

FIG. 9 is a rear perspective view of a portion of the articulated hinge assembly 200 and the linkage assembly 300 in accordance with an exemplary embodiment in a door closed position. FIG. 10 is a rear perspective view of a portion of the articulated hinge assembly 200 and the linkage assembly 300 in accordance with an exemplary embodiment in a door closed position. FIG. 11 is a front perspective view of a portion of the articulated hinge assembly 200 and the linkage assembly 300 in accordance with an exemplary embodiment in a door open position. FIG. 12 is a rear perspective view of a portion of the articulated hinge assembly 200 and the linkage assembly 300 in accordance with an exemplary embodiment in a door open position. FIG. 9 illustrates the fuselage bracket 130 coupled to the fuselage 106; however, the door bracket 126 is removed in FIG. 9 to illustrate the articulated hinge assembly 200 and the linkage assembly 300. The emergency power assist assembly 400 is removed in FIGS. 10 and 12 to illustrated the hinge assembly 200 and the linkage assembly 300.

The linkage assembly 300 is coupled to the articulated hinge arm 202, the fuselage bracket 130, and the door bracket 126 to control movement of the articulated hinge arm 202 and the door 120 during opening and closing. The linkage assembly 300 controls pivoting of the articulated hinge arm 202 relative to the fuselage bracket 130 during opening and closing of the door 120. The linkage assembly 300 controls pivoting of the first hinge member 210 relative to the second hinge member 250 during opening and closing of the door 120. For example, the hinge linkage assembly 310 is coupled to both the first hinge member 210 and the second hinge member 250 to control positioning of the first and second hinge members 210, 250 relative to each other. The linkage assembly 300 controls rotation of the drive shaft 290 during opening and closing of the door 120. The linkage assembly 300 controls pivoting of the door 120 relative to the articulated hinge arm 202 during opening and closing of the door 120. For example, the door linkage assembly 350 is coupled to both the first hinge member 210 and the second hinge member 250 to control movement of the door 120.

In an exemplary embodiment, the first and second hinge members 210, 250 are in a linear orientation in the door closed position. For example, the first and second hinge members 210, 250 are parallel to each other and generally in-line with each other, such as to extend along the door 120. In an exemplary embodiment, the first and second hinge members 210, 250 are angled relative to each other in the door open position. For example, the first and second hinge members 210, 250 may be in a generally perpendicular orientation. For example, the first hinge member 210 may be oriented at an angle between 85 and 105 degrees with the second hinge member 250 in the door open position.

The linkage assembly 300 is configured to cause the door 120 to move along a programed path as the door 120 moves from the door closed position to the door open position. For example, the geometry of the components (length and shape) of the links of the linkage assembly 300 and the connection points of the links to each other and to the articulated hinge arm 202 have been tailored to yield a desired or controlled motion (i.e. programmed). The sizing, positioning, and orientations of the components of the linkage assembly 300 contribute to the programmability of articulated hinge assembly 200. For example, the connection points between the linkages and the hinge members control the orientations of the hinge members relative to each other and relative to the fuselage as well as control the orientations of the door relative to the hinge members. Generally, the rotational and translational motions of the components of the linkage assembly 300 are transmitted through the various components to control the opening and closing of the door 120 relative to the fuselage 106.

The pistons 414, 434 of the emergency drive assembly 410 and the damper assembly 430, respectively, are extended in the door open position (FIG. 11). The drive shaft 290 is rotated from the door closed position to the door open position. The shaft brackets 292, 294 are rotated with the drive shaft 290 and the door pivot arm 360.

Figure 13:
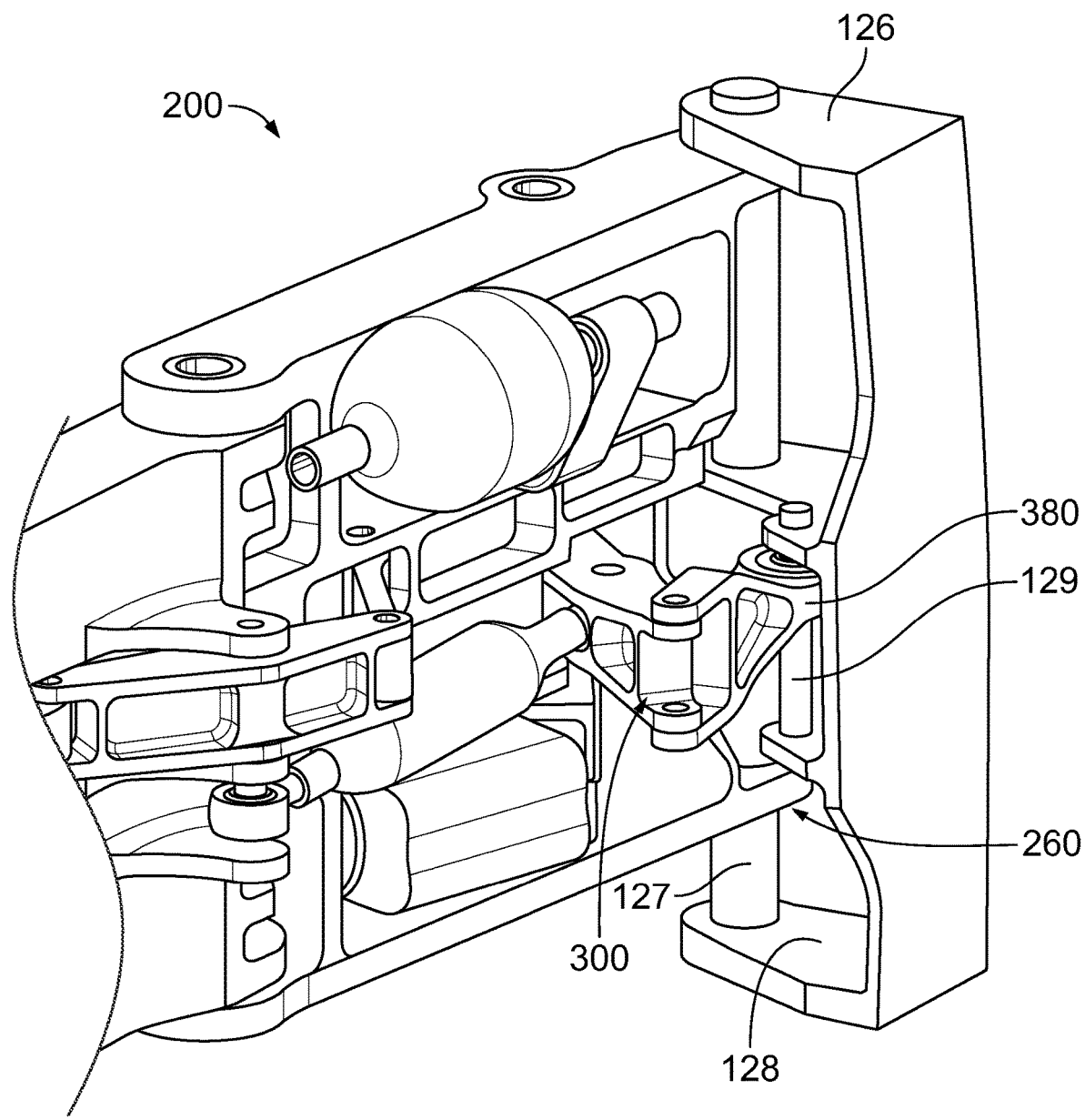
FIG. 13 is a rear perspective view of a portion of the articulated hinge assembly and the linkage assembly coupled to the door bracket in accordance with an exemplary embodiment showing the door bracket in a retracted position.
Figure 14:
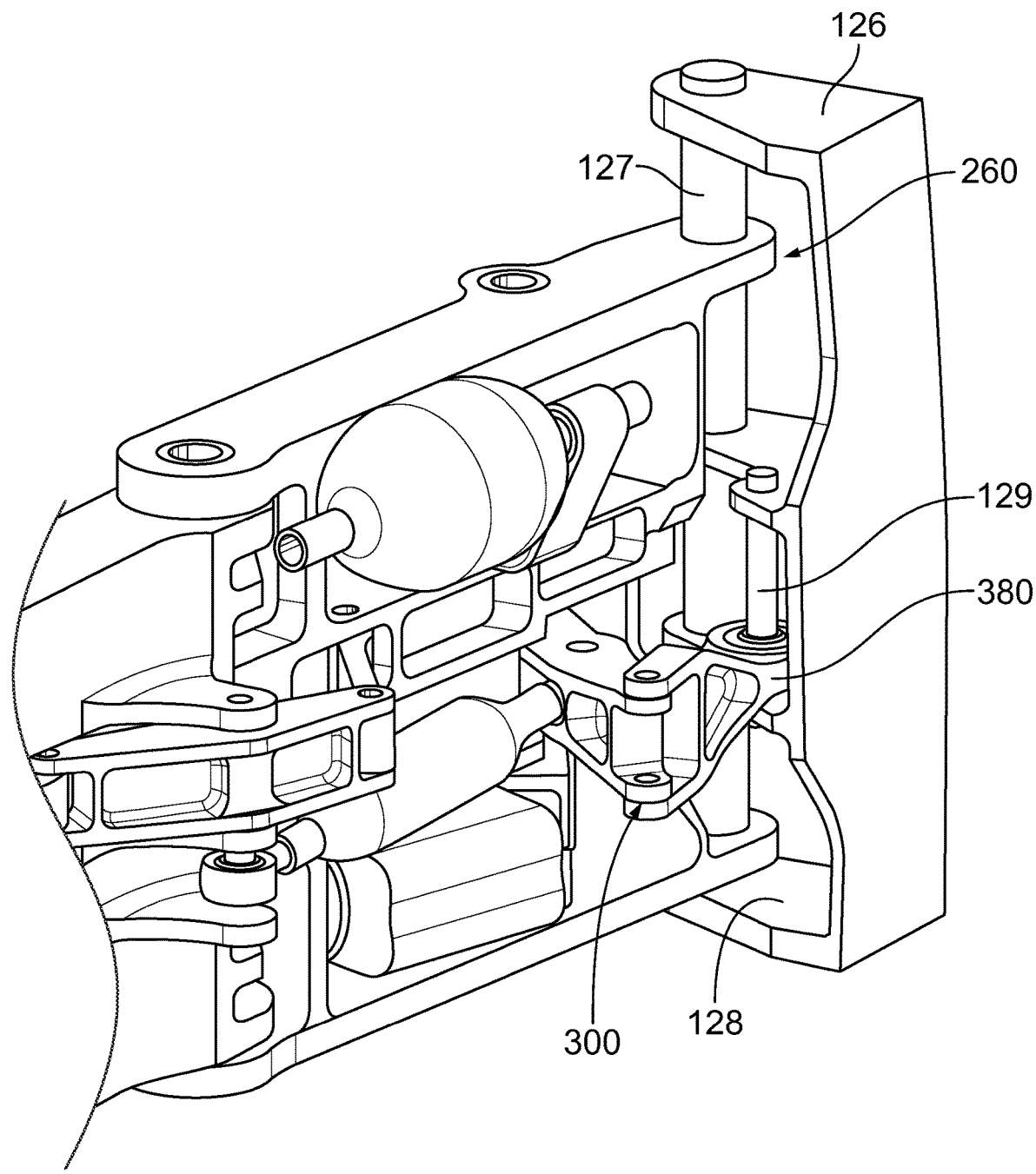
FIG. 14 is a rear perspective view of a portion of the articulated hinge assembly and the linkage assembly coupled to the door bracket in accordance with an exemplary embodiment showing the door bracket in an elevated position.

FIG. 13 is a rear perspective view of a portion of the articulated hinge assembly 200 and the linkage assembly 300 coupled to the door bracket 126 in accordance with an exemplary embodiment showing the door bracket 126 in a retracted position. FIG. 14 is a rear perspective view of a portion of the articulated hinge assembly 200 and the linkage assembly 300 coupled to the door bracket 126 in accordance with an exemplary embodiment showing the door bracket 126 in an elevated position.

In an exemplary embodiment, a lift assist device (not shown) is provided to assist lifting the door 120 during the opening process. The lift assist device may provide lift assistance via spring force applied to the door structure. For example, during opening, the door 120 may be initially moved vertically upward from the retracted position (FIG. 13) to the elevated position (FIG. 14), such as approximately 2 inches, prior to swinging from the closed position to the open position. The lift assist device may include a gas spring, mechanical spring, or powered lift device, such as an actuator and lift linkages. The lifting of the door 120 allows the door to unseat from the fuselage 106 within the opening prior to swinging the door 120 to the open position.

In an exemplary embodiment, the door bracket 126 includes the mounting shaft 127 held by the mounting bracket 128. The mounting bracket 128 is coupled to the door 120. The mounting shaft 127 connects the door fitting 260 to the mounting bracket 128. The door fitting 260 is rotatable about the mounting shaft 127. The mounting shaft 127 is movable vertically in the door fitting 260 between the retracted position and the elevated position. The door link arm 380 is coupled to a pin 129 of the door bracket 126. The door link arm 380 is pivotably coupled to the pin 129. The pin 129 is slidable in the door link arm 380 when the door moves vertically between the retracted position and the elevated position.

Figure 15:
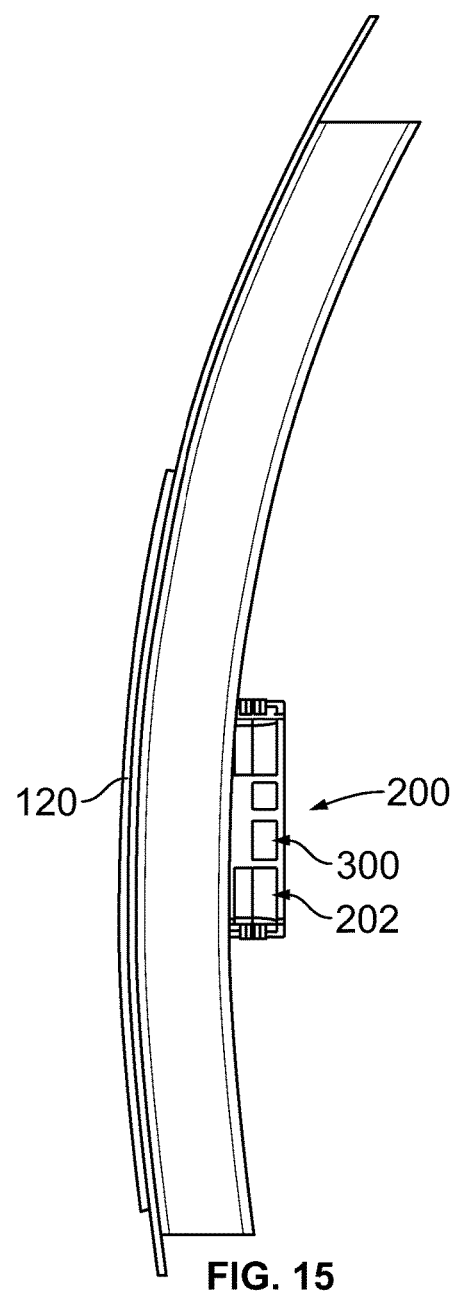
FIG. 15 is a side view of the door assembly showing the hinge assembly coupled to the door in accordance with an exemplary embodiment.
Figure 16:
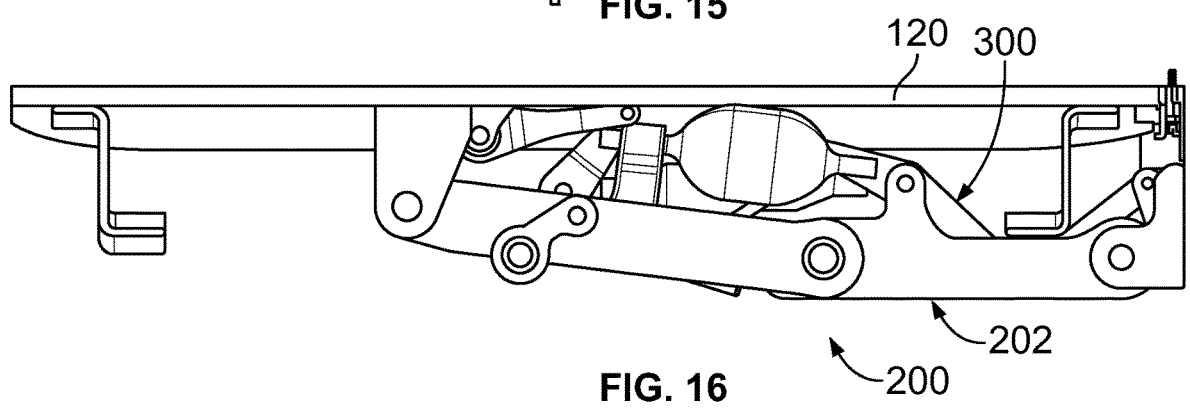
FIG. 16 is a top, sectional view of the door assembly showing the hinge assembly coupled to the door in accordance with an exemplary embodiment.

FIG. 15 is a side view of the door assembly showing the articulated hinge assembly 200 coupled to the door 120 in accordance with an exemplary embodiment. FIG. 16 is a top, sectional view of the door assembly showing the articulated hinge assembly 200 coupled to the door 120 in accordance with an exemplary embodiment. The articulated hinge assembly 200 has a low-profile relative to the door 120 into the interior of the passenger cabin. The components of the linkage assembly 300 are contained within the profile of the articulated hinge arm 202 so as to limit the space in the passenger cabin occupied by the articulated hinge assembly 200 and allow room for other elements within the space adjacent the door 120, such as passenger seats or additional galley space.

Figure 19:
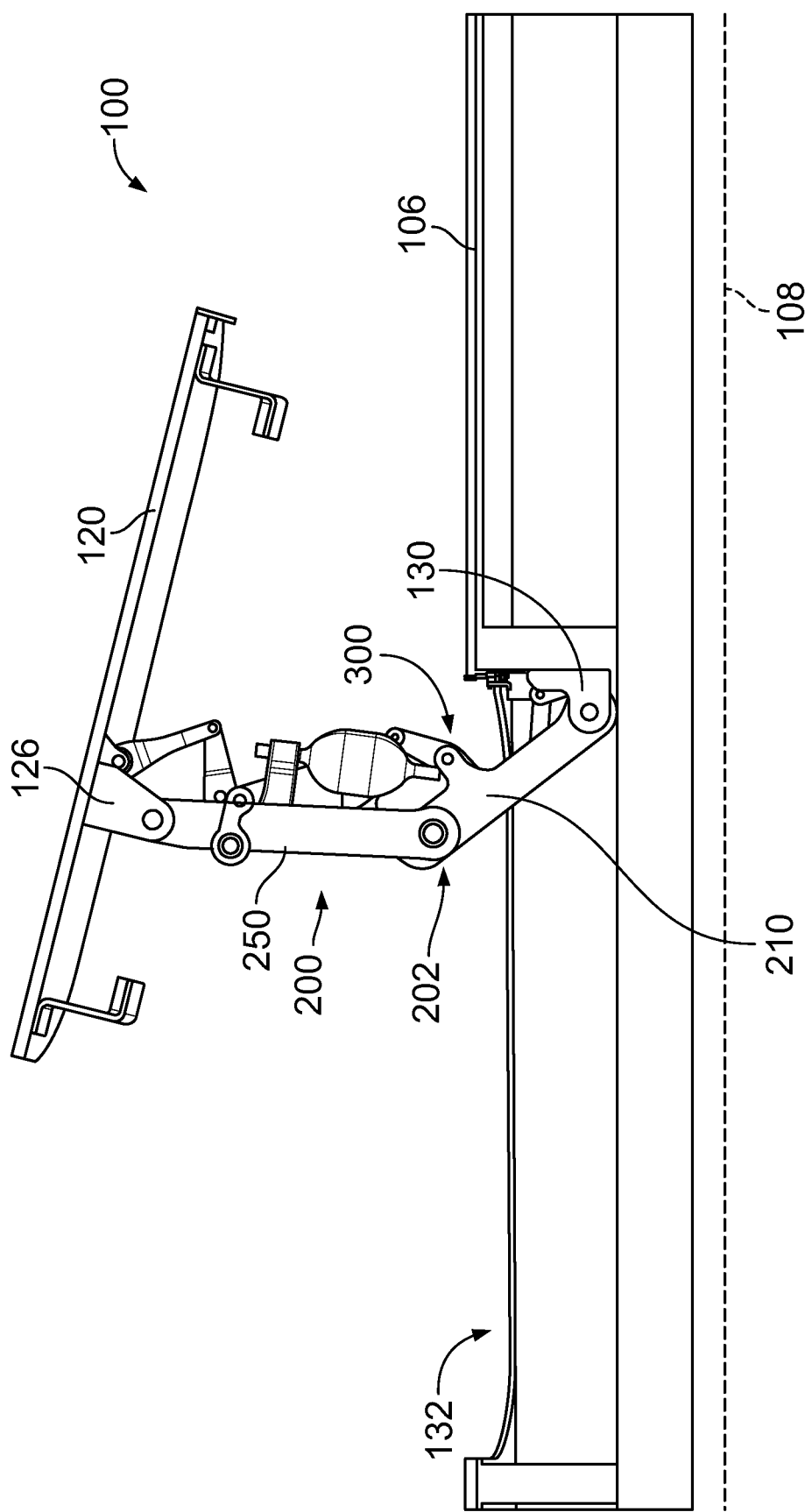
FIG. 19 illustrates the door in a partially open position showing the door at the nearly maximum distance from the fuselage in accordance with an exemplary embodiment.

FIGS. 17-20 illustrate an opening sequence for the door assembly. FIG. 17 illustrates the door assembly immediately after opening motion has started, just after the door leaves the fully closed position. FIG. 18 illustrates the door assembly in a partially opened position showing the door 120 removed from the door opening 132. FIG. 19 illustrates the door in a partially open position showing the door 120 nearly at the maximum distance from the fuselage 106. FIG. 20 illustrates the door in a fully open position. The bumper 134 between the first hinge member 210 and the fuselage bracket 130 stops the first hinge member 210 in the door open position.

The articulated hinge arm 202 rotates relative to the fuselage 106 from the fully closed position to the fully open position. The articulated hinge assembly 200 controls the orientation of the door 120 relative to the fuselage 106 through the range of motion. For example, the linkage assembly 300 causes the door 120 to move along a certain path as the door moves from the closed position to the open position. The door 120 may be slightly angled or tipped outward during the opening sequence (for example, with the aft edge located further from the fuselage than the forward edge). In the open position, the door 120 may be oriented generally parallel to the longitudinal axis 108. However, changing link ratios may allow angling of the door at different angles, such as to follow a taper of the fuselage, in the open position. The links of the linkage assembly 300 rotate/pivot as the door 120 is moved from the closed position to the open position to control the orientation of the door 120 relative to the fuselage 106. The programmed or controlled rotation of the links maintains the door orientation. The articulated hinge arm 202 articulates between the first and second hinge members 210, 250 to allow the articulated hinge arm 202 to wrap around the edge of the door opening 132 to position the door 120 forward of the door opening 132 in the open position.

During operation, the door 120 can be opened by manually rotating a door handle (not shown) to unlock the door assembly, and manually applying a force to move the door 120 outward and forward. When the door 120 is opened, the articulated hinge arm 202 rotates about the fuselage bracket 130 and the door bracket 126. The second hinge member 250 is translated outward by the first hinge member 210, causing the door 120 to be swung away from the door opening 132. The linkage assembly 300 controls the orientation of the door 120 around the pivot point at the fuselage bracket 130 and at the door bracket 126 as the door 120 is opened and translated away from the fuselage 106. When the door is fully opened, the inside of the door 120 is adjacent the outer skin of the aircraft 100 while the door 120 has been translated out away from, and forward of, the door opening 132. When the door 120 is closed, the articulated hinge assembly 200 is pulled in the opposite direction. As a result, the door 120 is translated in the opposite direction. Thus, when the door 120 is moved into the door opening 132, the door is correctly seated.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. An articulated hinge assembly for connecting a door to a fuselage of an aircraft, the articulated hinge assembly comprising:
   an articulated hinge arm having a first hinge member and a second hinge member pivotably coupled to the first hinge member at an elbow, the first hinge member including a fuselage fitting configured to be pivotably coupled to a fuselage bracket mounted to the fuselage adjacent a door opening of the aircraft, the second hinge member including a door fitting configured to be pivotably coupled to a door bracket of the door; and
   a linkage assembly coupled to the articulated hinge arm, the fuselage fitting and the door fitting, the linkage assembly including a hinge linkage assembly coupled to the articulated hinge arm and the fuselage fitting, the hinge linkage assembly controlling movement of the first hinge member and the second hinge member relative to each other and relative to the fuselage fitting, the linkage assembly including a door linkage assembly coupled to the articulated hinge arm and the door to control positioning of the door relative to the second hinge member when the door is moved from a door closed position to a door open position, the linkage assembly configured to cause the door to move along a programed path relative to the fuselage as the door moves from the door closed position to the door open position.

2. The articulated hinge assembly of claim 1, wherein the articulated hinge arm includes a connecting shaft at the elbow, the first and second hinge members being pivotably coupled to the connecting shaft.

3. The articulated hinge assembly of claim 1, wherein the first and second hinge members are in a linear orientation in the door closed position and wherein the first hinge member is oriented at an angle between 85 and 105 degrees with the second hinge member in the door open position.

4. The articulated hinge assembly of claim 1, wherein the hinge linkage assembly is coupled to both the first hinge member and the second hinge member and wherein the door linkage assembly is coupled to both the first hinge member and the second hinge member.

5. The articulated hinge assembly of claim 1, wherein the hinge linkage assembly includes a hinge pivot arm pivotably coupled to the first hinge member, a hinge connecting arm between the hinge pivot arm and the fuselage bracket, and a hinge link arm between the hinge pivot arm and the second hinge member.

6. The articulated hinge assembly of claim 5, wherein the hinge pivot arm includes a pivot axis at a central portion between a first end and a second end of the hinge pivot arm, the hinge connecting arm coupled to the hinge pivot arm at the first end, the hinge link arm coupled to the hinge pivot arm at the second end.

7. The articulated hinge assembly of claim 1, wherein the door linkage assembly includes a door pivot arm pivotably coupled to the second hinge member, a door connecting arm between the door pivot arm and the first hinge member, and a door link arm between the door pivot arm and the door bracket.

8. The articulated hinge assembly of claim 7, wherein the door link arm is coupled to the door pivot arm at a first end of the door pivot arm, the door connecting arm coupled to a central portion of the door pivot arm, the door pivot arm includes a pivot axis at a second end of the door pivot arm.

9. The articulated hinge assembly of claim 1, wherein the linkage assembly includes a drive shaft rotatably coupled to the second hinge member, the door linkage assembly being coupled to and rotatable with the drive shaft.

10. The articulated hinge assembly of claim 9, further comprising an emergency power assist assembly coupled to the first hinge member and coupled to the driveshaft to control rotation of the driveshaft.

11. The articulated hinge assembly of claim 1, further comprising an emergency power assist assembly attached between the linkage assembly and the articulated hinge arm so as to drive the door open in an emergency and to limit the speed of the motion of the articulated hinge arm when the articulated hinge arm is moved between the door closed position to the door open position.

12. The articulated hinge assembly of claim 1, wherein the articulated hinge arm is configured so that when the door is moved from the door closed position to the door open position the articulated hinge arm is pivoted through the door opening and the door is laterally offset from the door opening.

13. The articulated hinge assembly of claim 1, wherein the linkage assembly is configured to cause the door to move along a programmed path relative to a longitudinal axis of the fuselage as the door moves between the door closed position and the door open position.

14. The articulated hinge assembly of claim 1, further comprising a bumper coupled to the fuselage bracket, the bumper configured to stop the first hinge member in the door open position.

15. An articulated hinge assembly for connecting a door to a fuselage of an aircraft, the articulated hinge assembly comprising:
   an articulated hinge arm having a first hinge member, a second hinge member, and a connecting shaft, the first and second hinge members being pivotably coupled to the connecting shaft at an elbow, the first hinge member extending between a forward end and an aft end, the aft end of the first hinge member being coupled to the connecting shaft, the first hinge member including a fuselage fitting at the forward end of the first hinge member configured to be pivotably coupled to a fuselage bracket mounted to the fuselage adjacent a door opening of the aircraft, the second hinge member including a forward end and an aft end, the forward end of the second hinge member being coupled to the connecting shaft, the second hinge member including a door fitting at the aft end of the second hinge member configured to be pivotably coupled to a door bracket of the door; and
   a linkage assembly coupled to the articulated hinge arm, the fuselage fitting and the door fitting, the linkage assembly comprising:
   a hinge linkage assembly coupled to the articulated hinge arm and the fuselage fitting, the hinge linkage assembly controlling movement of the first hinge member and the second hinge member relative to each other and relative to the fuselage fitting, the hinge linkage assembly including a hinge pivot arm pivotably coupled to the first hinge member, the hinge linkage assembly including a hinge connecting arm between the hinge pivot arm and the fuselage bracket, the hinge linkage assembly including a hinge link arm between the hinge pivot arm and the second hinge member; and a door linkage assembly coupled to the articulated hinge arm and the door to control positioning of the door relative to the second hinge member when the door is moved from a door closed position to a door open position, the door linkage assembly including a door pivot arm pivotably coupled to the second hinge member, the door linkage assembly including a door connecting arm between the door pivot arm and the first hinge member, the door linkage assembly including a door link arm between the door pivot arm and the door bracket, the linkage assembly configured to cause the door to move along a programed path relative to the fuselage as the door moves from the door closed position to the door open position.

16. The articulated hinge assembly of claim 15, wherein the first and second hinge members are in a linear orientation in the door closed position and wherein the first hinge member is oriented at an angle between 85 and 105 degrees with the second hinge member in the door open position.

17. The articulated hinge assembly of claim 15, wherein the hinge linkage assembly is coupled to both the first hinge member and the second hinge member and wherein the door linkage assembly is coupled to both the first hinge member and the second hinge member.

18. The articulated hinge assembly of claim 15, wherein the hinge pivot arm includes a pivot axis at a central portion approximately centered between a first end and a second end of the hinge pivot arm, the hinge connecting arm coupled to the hinge pivot arm at the first end, the hinge link arm coupled to the hinge pivot arm at the second end, and wherein the door pivot arm includes a pivot axis at a central portion of the door pivot arm, the door connecting arm coupled to a first end of the door pivot arm, the door link arm coupled to the door pivot arm at a second end of the door pivot arm.

19. An articulated hinge assembly for connecting a door to a fuselage of an aircraft, the articulated hinge assembly comprising:

an articulated hinge arm having a first hinge member and a second hinge member pivotably coupled to the first hinge member at an elbow, the first hinge member including a fuselage fitting configured to be pivotably coupled to a fuselage bracket mounted to the fuselage adjacent a door opening of the aircraft, the second hinge member including a door fitting configured to be pivotably coupled to a door bracket of the door;

a linkage assembly coupled to the articulated hinge arm, the fuselage fitting and the door fitting, the linkage assembly including a hinge linkage assembly coupled to the articulated hinge arm and the fuselage fitting, the hinge linkage assembly controlling movement of the first hinge member and the second hinge member relative to each other and relative to the fuselage fitting, the linkage assembly including a door linkage assembly coupled to the articulated hinge arm and the door to control positioning of the door relative to the second hinge member when the door is moved from a door closed position to a door open position, the linkage assembly configured to cause the door to move along a programed path relative to the fuselage as the door moves from the door closed position to the door open position; and an emergency power assist assembly attached between the linkage assembly and the articulated hinge arm so as to drive the door open in an emergency, and to limit the speed of the motion of the articulated hinge arm when the articulated hinge arm is moved between the door closed position to the door open position.

20. The articulated hinge assembly of claim 19, wherein the emergency power assist assembly includes an actuator and a piston operably coupled to the actuator, the actuator coupled to one of the first hinge member or the second hinge member, the piston being coupled to the other of the first hinge member or the second hinge member, the actuator being operated to pivot the second hinge member relative to the first hinge member to open the door.

* * * * *